US011695757B2

(12) United States Patent
Divoux et al.

(10) Patent No.: US 11,695,757 B2
(45) Date of Patent: *Jul. 4, 2023

(54) FAST SMART CARD LOGIN

(71) Applicant: Citrix Systems, Inc., Fort Lauderdale, FL (US)

(72) Inventors: Hubert Divoux, Parkland, FL (US); David Williams, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/176,011

(22) Filed: Feb. 15, 2021

(65) Prior Publication Data

US 2021/0168136 A1 Jun. 3, 2021

Related U.S. Application Data

(63) Continuation of application No. 16/111,328, filed on Aug. 24, 2018, now Pat. No. 10,958,640.
(Continued)

(51) Int. Cl.
*H04L 9/40* (2022.01)
*G06F 21/60* (2013.01)
*G06F 21/34* (2013.01)

(52) U.S. Cl.
CPC .......... *H04L 63/0853* (2013.01); *G06F 21/34* (2013.01); *G06F 21/602* (2013.01);
(Continued)

(58) Field of Classification Search
CPC ... G06F 21/34; G06F 21/602; H04L 63/0876; H04L 63/0853; H04L 63/0807; H04L 63/0815
See application file for complete search history.

(56) References Cited

U.S. PATENT DOCUMENTS 5,959,276 A * 9/1999 Iijima ................. G06Q 20/355
235/492
7,194,545 B2 * 3/2007 Urien ..................... H04L 61/00
709/202

(Continued)

FOREIGN PATENT DOCUMENTS

| JP | 2010-537340 A | 12/2010 |
| JP | 2013-191117 A | 9/2013 |
| JP | 2015-511470 A | 4/2015 |

OTHER PUBLICATIONS

D. Pedraja, J. Baliosian and G. Betarte, "Offloading Cryptographic Services to the SIM Card," 2018 Eighth Latin-American Symposium on Dependable Computing (LADC), Foz do Iguacu, Brazil, 2018, pp. 47-56. (Year: 2018).*

(Continued)

*Primary Examiner* — Kari L Schmidt

(57) ABSTRACT

Methods and systems for faster and more efficient smart card logon in a remote computing environment are described herein. Fast smart card logon may be used to reduce latency and improve security. For example, the system may reduce the number of operations (e.g., interactions) between a server used for authentication and the client device. A virtual channel may be established between the server and the client device. The server may receive, from the client device a message including answer to reset (ATR) data of a smart card associated with the client device. The server may substitute the ATR data of the smart card with proxy ATR data of a proxy smart card. The server may determine, based on the proxy ATR data, a cryptographic service provider. The server may transmit, via the cryptographic service provider, via the virtual channel, and to the client device, one or more requests for a cryptographic operation involving the smart card.

20 Claims, 20 Drawing Sheets

Related U.S. Application Data

(60) Provisional application No. 62/627,790, filed on Feb. 8, 2018.

(52) U.S. Cl.
CPC ...... H04L 63/0807 (2013.01); H04L 63/0815 (2013.01); H04L 63/0876 (2013.01)

(56) References Cited

U.S. PATENT DOCUMENTS

| | | | | |
|---|---|---|---|---|
| 9,526,008 | B2* | 12/2016 | Prabdial | H04W 8/04 |
| 9,817,582 | B2 | 11/2017 | Green et al. | |
| 10,798,097 | B2* | 10/2020 | Vajravel | H04L 67/148 |
| 2003/0177353 | A1* | 9/2003 | Hiltgen | H04L 9/3234 |
| | | | | 713/161 |
| 2007/0282881 | A1 | 12/2007 | Relyea | |
| 2008/0245860 | A1* | 10/2008 | Polano | G06Q 20/341 |
| | | | | 235/382 |
| 2009/0064301 | A1* | 3/2009 | Sachdeva | G06F 21/33 |
| | | | | 726/9 |
| 2010/0015993 | A1 | 1/2010 | Dingier et al. | |
| 2010/0169962 | A1* | 7/2010 | Lu | G06F 21/34 |
| | | | | 726/5 |
| 2011/0296513 | A1 | 12/2011 | Kasad | |
| 2011/0315763 | A1* | 12/2011 | Hochmuth | G06K 19/07 |
| | | | | 235/380 |
| 2012/0190354 | A1* | 7/2012 | Merrien | H04L 67/34 |
| | | | | 455/422.1 |
| 2012/0266212 | A1* | 10/2012 | Jiang | H04L 63/0853 |
| | | | | 726/3 |
| 2014/0007205 | A1 | 1/2014 | Oikonomou | |
| 2014/0310785 | A1* | 10/2014 | Prabdial | H04W 12/04 |
| | | | | 726/5 |
| 2014/0351494 | A1* | 11/2014 | Barthe | G06F 3/061 |
| | | | | 711/115 |
| 2015/0181410 | A1* | 6/2015 | Liu | H04W 12/04 |
| | | | | 455/419 |
| 2015/0288686 | A1* | 10/2015 | Pepin | H04L 63/0876 |
| | | | | 713/173 |
| 2015/0310434 | A1 | 10/2015 | Cheung | |
| 2016/0094543 | A1* | 3/2016 | Innes | H04L 9/3263 |
| | | | | 726/6 |
| 2016/0094546 | A1* | 3/2016 | Innes | H04L 63/0815 |
| | | | | 713/156 |
| 2016/0183064 | A1 | 6/2016 | Wouhaybi | |
| 2017/0364907 | A1* | 12/2017 | Chamberot | G06F 21/83 |
| 2018/0007059 | A1* | 1/2018 | Innes | G06F 21/6218 |
| 2018/0068307 | A1* | 3/2018 | Chamberot | G07F 7/1008 |
| 2018/0115613 | A1* | 4/2018 | Vajravel | G06F 9/452 |
| 2018/0121224 | A1* | 5/2018 | Vajravel | G06F 9/4484 |
| 2019/0362341 | A1* | 11/2019 | Chen | G06Q 20/4018 |

OTHER PUBLICATIONS

Avoine, Gildas, et al. "A survey of security and privacy issues in ePassport protocols." ACM Computing Surveys (CSUR) 48.3 (2016): 1-37. (Year: 2016).*

Apr. 28, 2022—U.S. Non-final Office Action—U.S. Appl. No. 17/063,198.

Sep. 16, 2021—JP Decision to Grant a Patent—App. No. 2020-542836.

* cited by examiner

FAST SMART CARD LOGIN

CROSS-REFERENCE TO RELATED APPLICATIONS

This application claims priority to U.S. patent application Ser. No. 16/111,328, filed Aug. 24, 2018 and entitled "FAST SMART CARD LOGIN," which is a continuation of U.S. provisional patent application Ser. No. 62/627,790, filed Feb. 8, 2018 and entitled "FAST SMART CARD LOGON." This application is related by subject matter to U.S. patent application Ser. No. 14/870,435, filed Sep. 30, 2015 and entitled "FAST SMART CARD LOGON" and U.S. provisional patent application Ser. No. 62/057,344, filed Sep. 30, 2014 and entitled "FAST SMART CARD LOGON AND FEDERATED FULL DOMAIN LOGON." Each of the prior applications is herein incorporated by reference in its entirety for all purposes.

FIELD

Aspects described herein generally relate to logging on a client to a remote computing environment using a smart card.

BACKGROUND

Traditionally, smart card authentication involves numerous interactions between a server (authentication) device and a client device. In remote computing environments, the numerous interactions are greatly slowed down by any increase in latency on connections between the server and the client.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards methods and systems for faster and more efficient logon, such as with a smart card.

Fast smart card logon may be used to reduce latency and improve security. For example, the system may reduce the number of operations (e.g., interactions) between a server device used for authentication and the client device. These operations may include fetching a user certificate from the smart card or signing data. Fast smart card logon may also improve security by optionally avoiding PIN (or other credential) transmission over networks, and to enable single sign on from an authentication event (e.g., Secure Sockets Layer (SSL) or Transport Layer Security (TLS) authentication) using a smart card to the actual remote computing environment logon without resorting to PIN caching.

The components used to implement fast smart card logon may also be used to implement a federated full domain logon. A virtual smart card credential, which may be ephemeral, may be issued based on the acceptance of an external authentication event. Example external authentication events include logon at a Security Assertion Markup Language (SAML) Identity Provider, smart card authentication over TLS or SSL, and alternative authentication credentials such as biometrics or one-time password (OTP) without AD password. Moreover, the certificate operation interception components from fast smart card logon may be used to enable interaction with the virtual smart card without fully emulating a smart card at the PC/SC API level. The virtual smart card may be created locally on the remote computing environment or on a separate server that may be highly protected.

Aspects described herein are directed towards systems, apparatuses, computer-readable media, memory, and methods for faster smart card logon. A method may comprise establishing a remoting channel between a server and a client device. The server may receive, from the client device and/or via a personal computer/smart card (PC/SC) protocol, a message comprising an identifier for a smart card associated with the client device. The server may replace the identifier with a substitute identifier for the smart card. Based on the substitute identifier, the server may determine a cryptographic service provider to use for one or more cryptographic operations associated with the smart card. The method may comprise transmitting, via the determined cryptographic service provider, via the remoting channel, and/or to the client device, one or more requests for a cryptographic operation involving the smart card.

In some examples, the identifier may comprise answer to reset (ATR) data, and the substitute identifier may comprise substitute ATR data. Additionally or alternatively, the identifier for the smart card may identify a smart card type of the smart card.

In some examples, determining the cryptographic service provider may comprise querying a database for an association between the substitute identifier and the cryptographic service provider to use for one or more cryptographic operations with the smart card. The database may comprise a registry in some scenarios. The method may comprise generating the substitute identifier and/or storing, in the database, the substitute identifier in association with the cryptographic service provider to use for one or more cryptographic operations with the smart card. In some examples, storing the substitute identifier in association with the cryptographic service provider to use for one or more cryptographic operations with the smart card may comprise storing the substitute identifier in a same file as information identifying the cryptographic service provider to use for one or more cryptographic operations with the smart card.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, apparatuses, computer-readable media, memory, and methods for faster smart card logon. A remoting channel may be established between a server and a client device. The server may receive, from the client device and/or via a personal computer/smart card (PC/SC) protocol, a message comprising an identifier for a smart card associated with the client device. The server may replace the identifier for the smart card with a substitute identifier. Based on the substitute identifier, the server may determine a cryptographic service provider to use for one or more cryptographic operations associated with the smart card. In some aspects, one or more requests for a cryptographic operation involving the smart card may be transmitted to the client device, such as via the determined cryptographic service provider and/or via the remoting channel.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
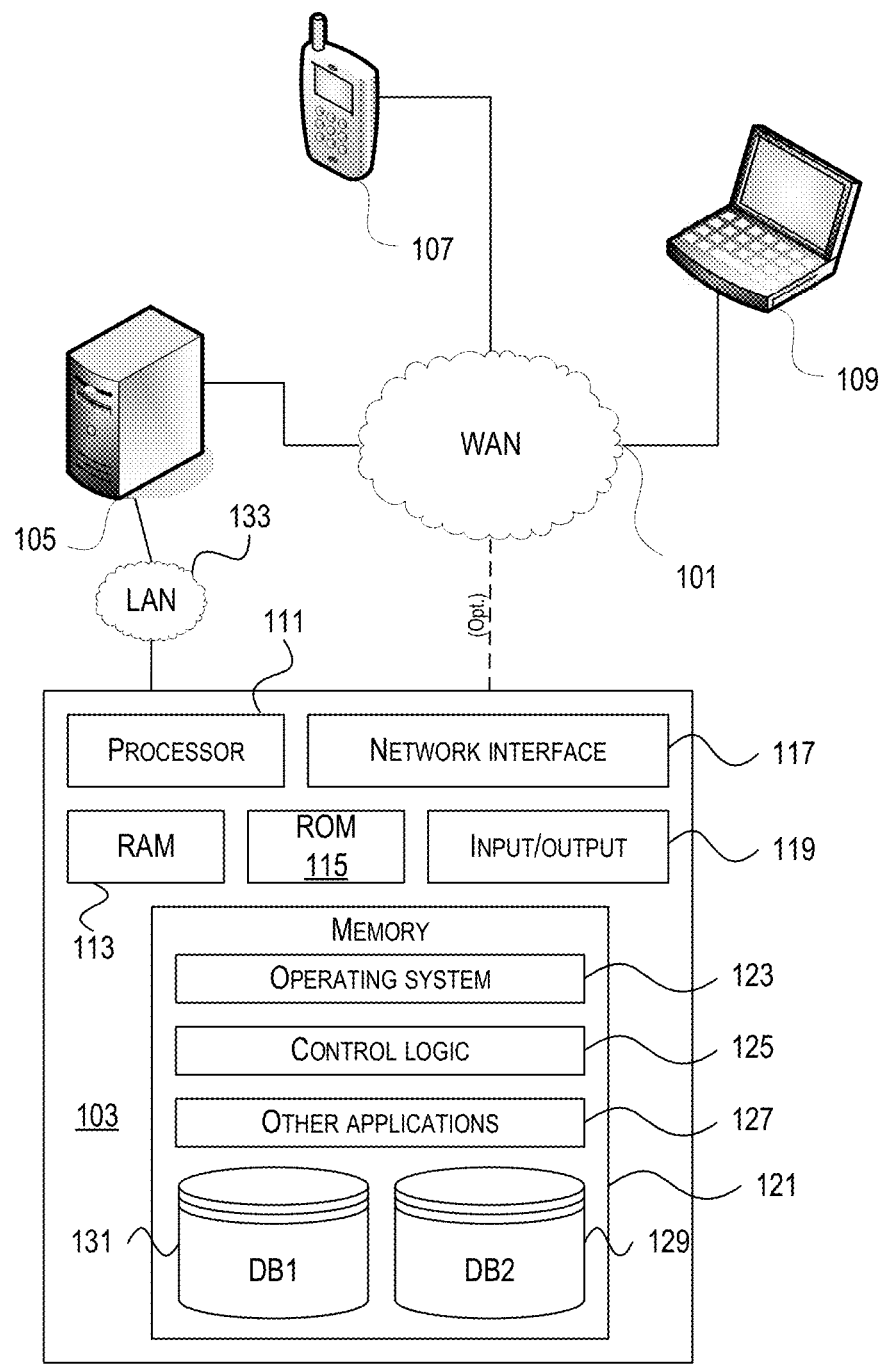
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
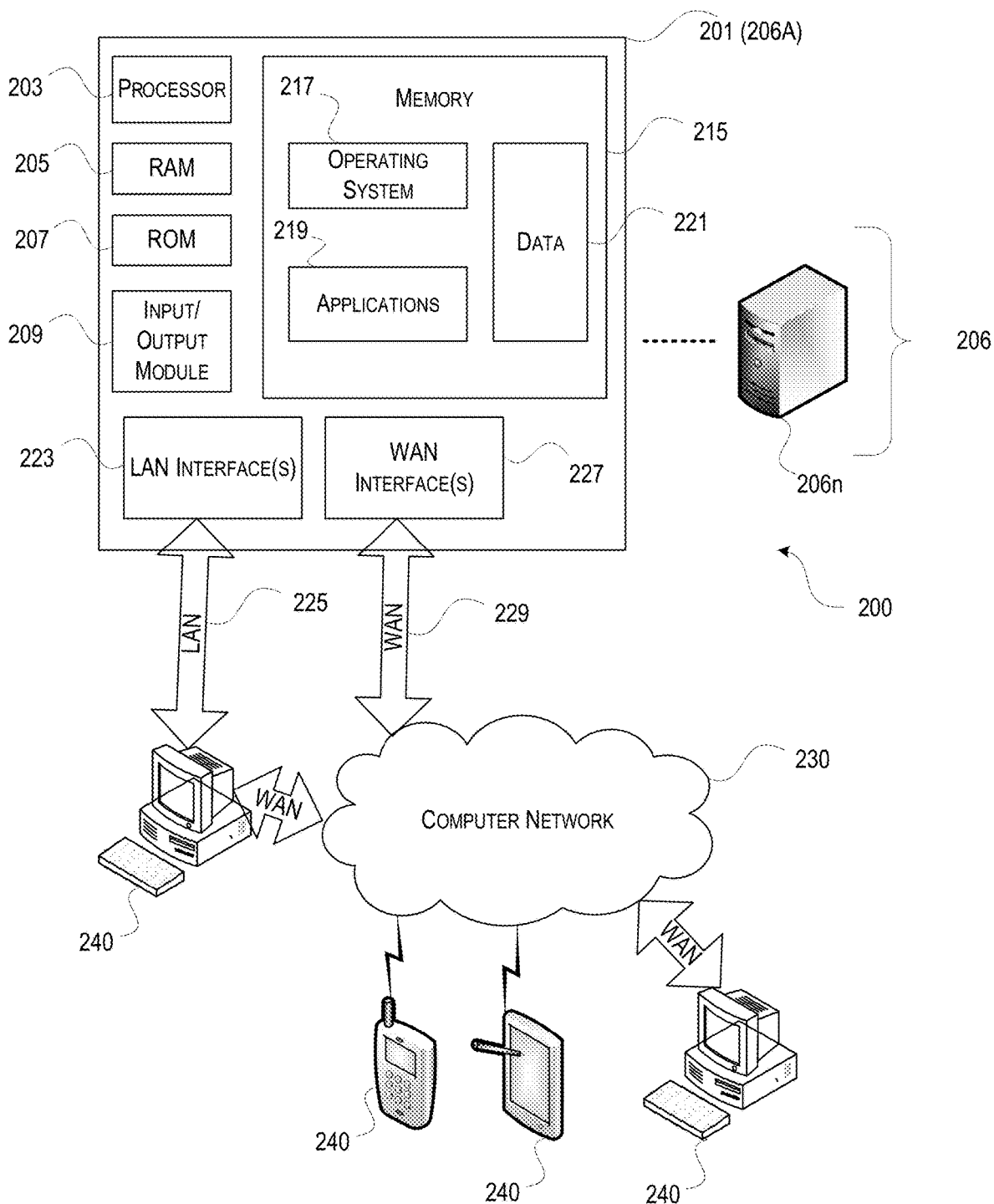
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
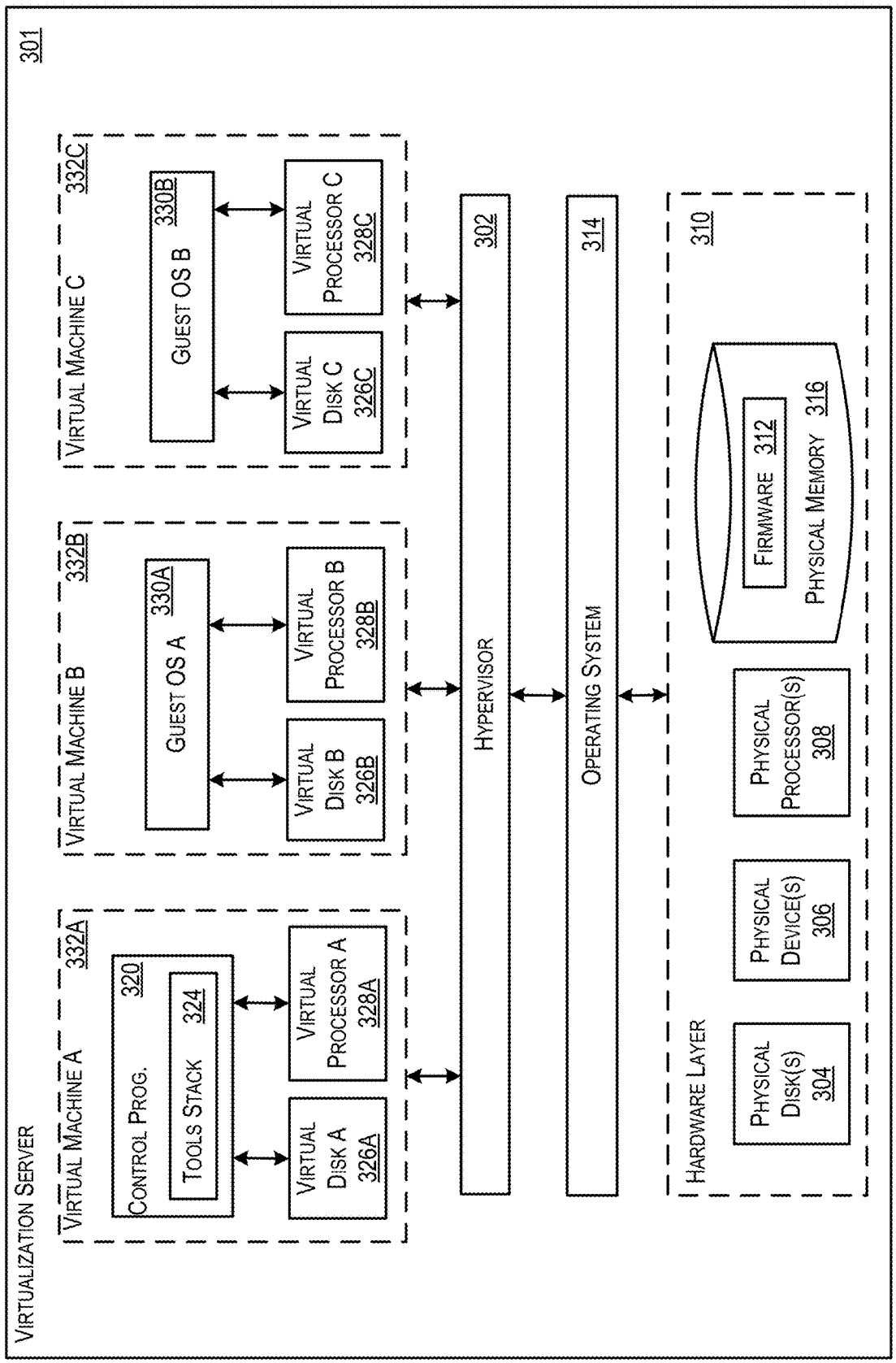
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
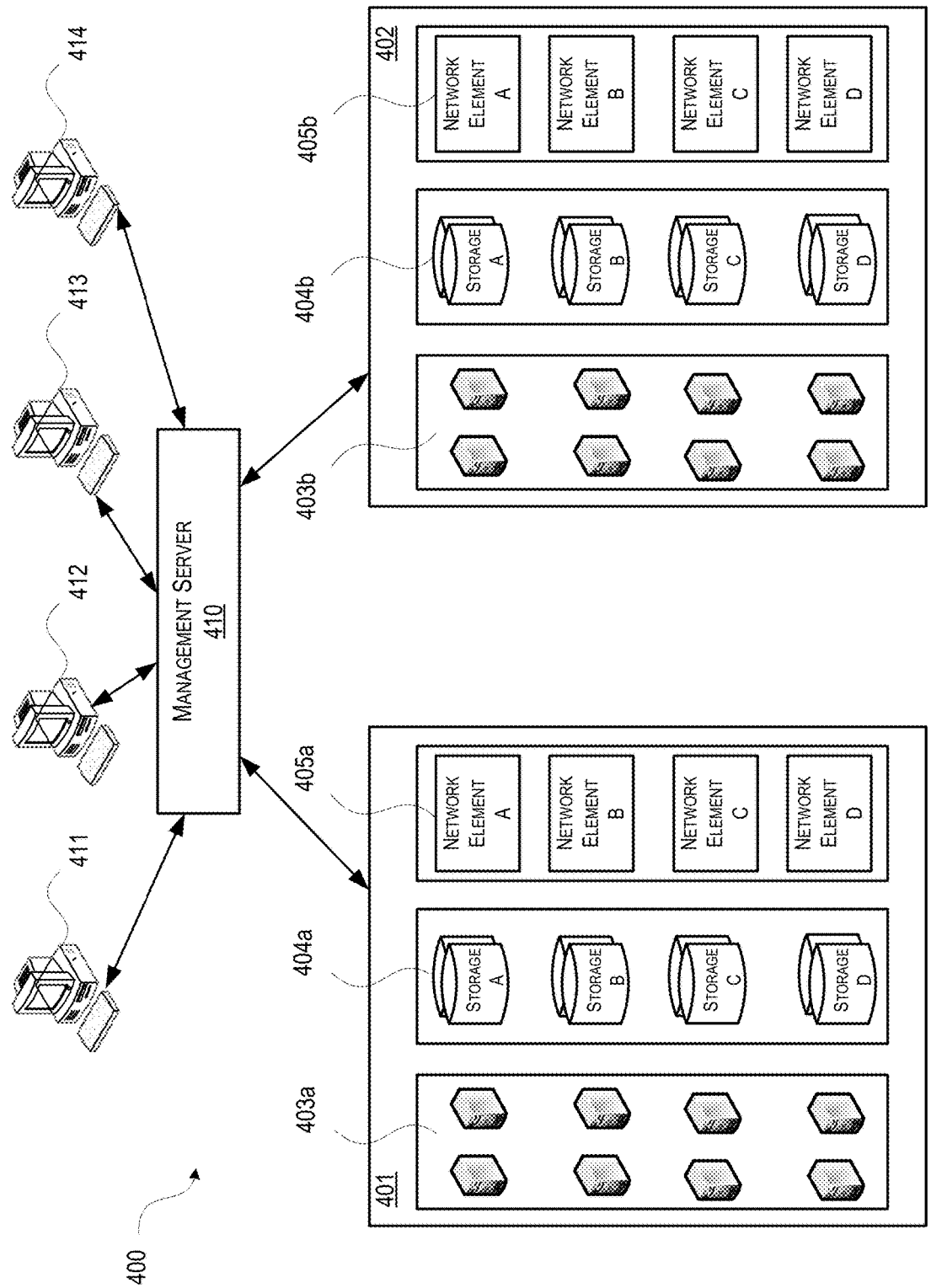
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
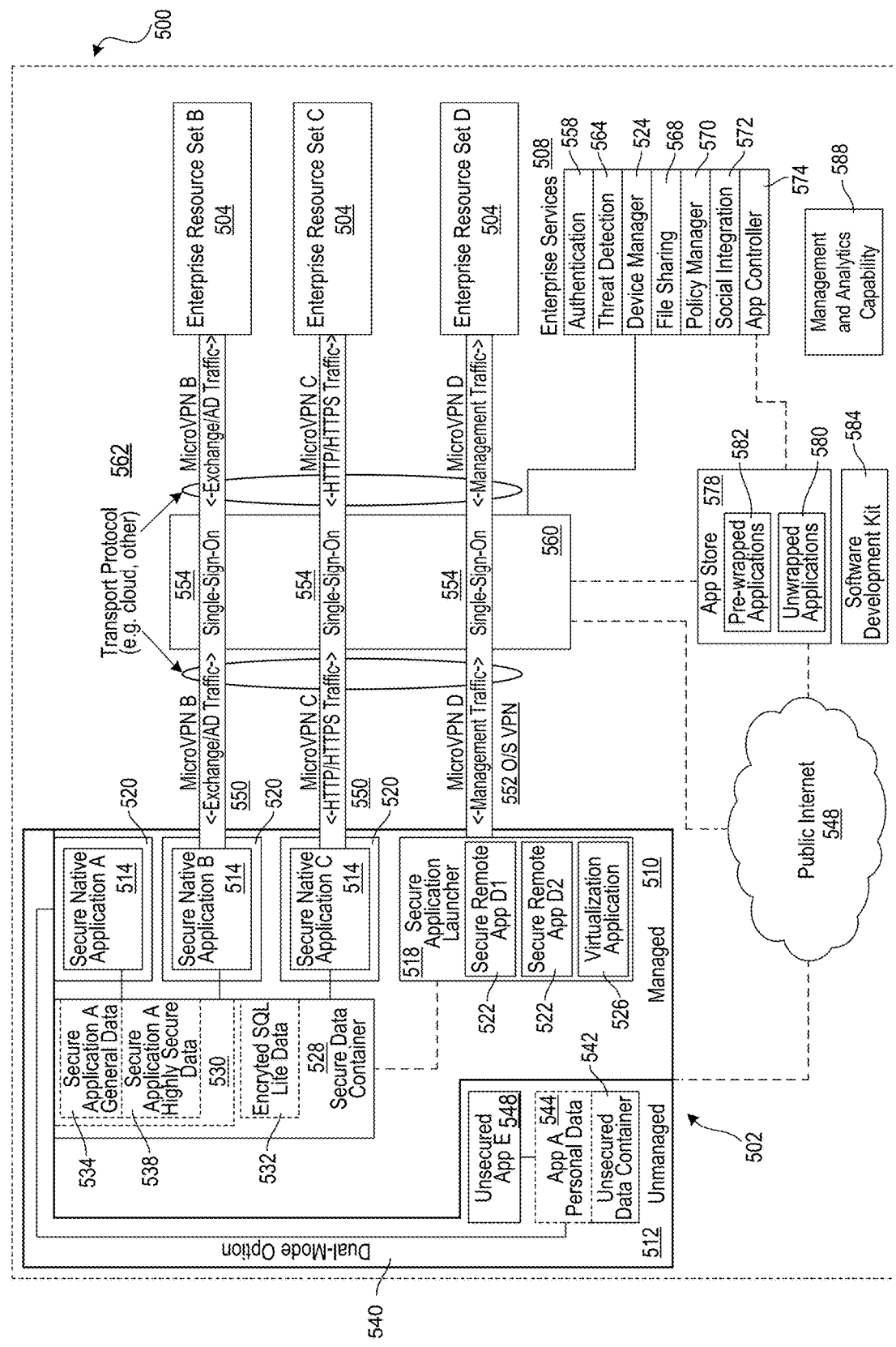
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
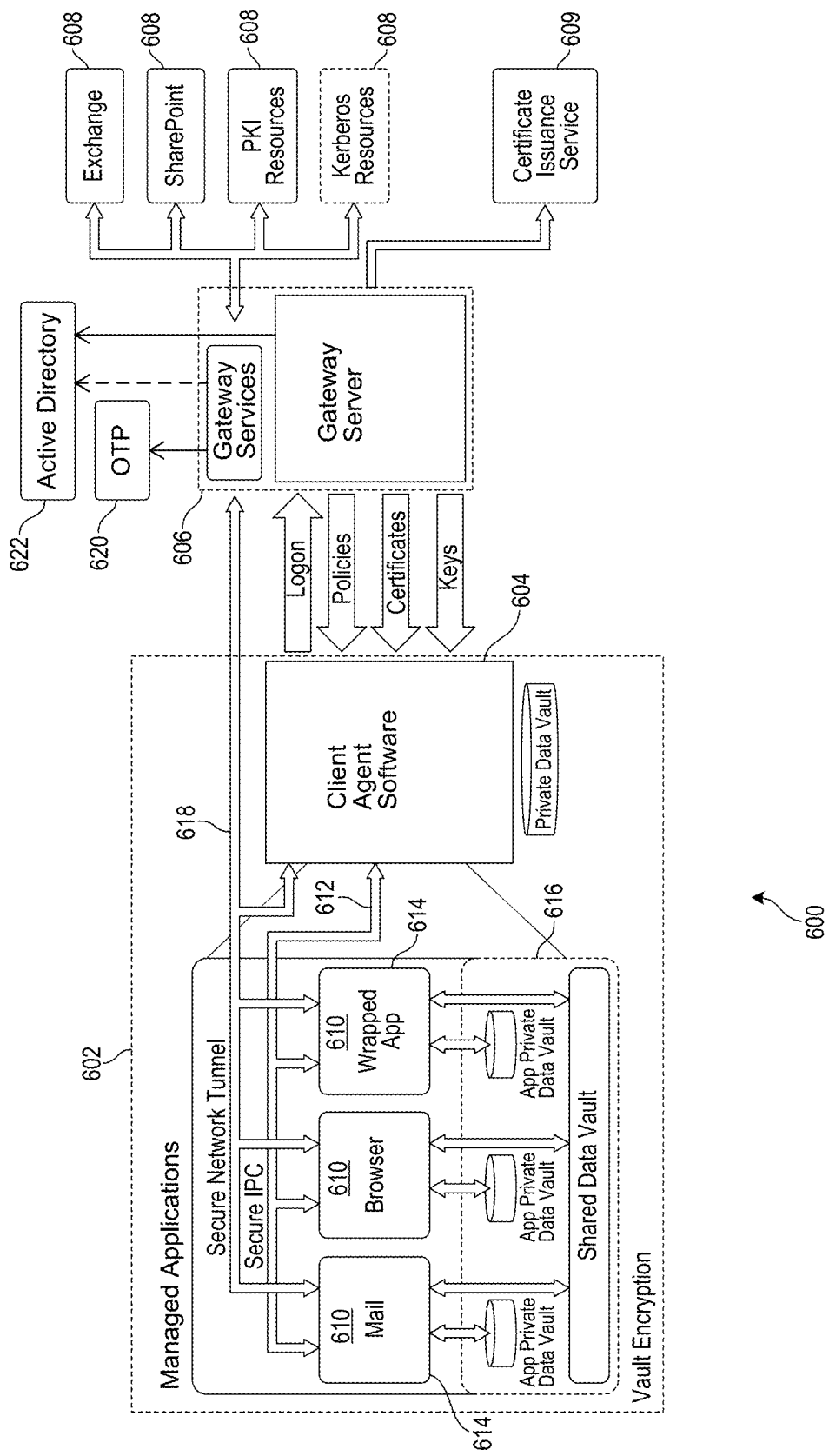
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Illustrative Embodiments of Smart Card Login

Fast smart card logon may be used to authenticate a user or client device to a server, such as an interactive server (e.g., a MICROSOFT Virtual Desktop Infrastructure (VDI)/ Remote Desktop Services (RDS) server, and the like), using a smart card, while reducing latency and improving security. For example, the system may reduce the number of operations (e.g., interactions) between a server device used for authentication and the client device. These operations may include fetching a user certificate from the smart card or signing data. Accordingly, smart card network chatter that cause PC/SC logons to be slow may be reduced. Fast smart card logon may also improve security by optionally avoiding PIN (or other credential) transmission over networks, and to enable single sign on from an authentication event (e.g., Secure Sockets Layer (SSL) or Transport Layer Security (TLS) authentication) using a smart card to the actual interactive server logon without resorting to PIN caching.

Figure 7:
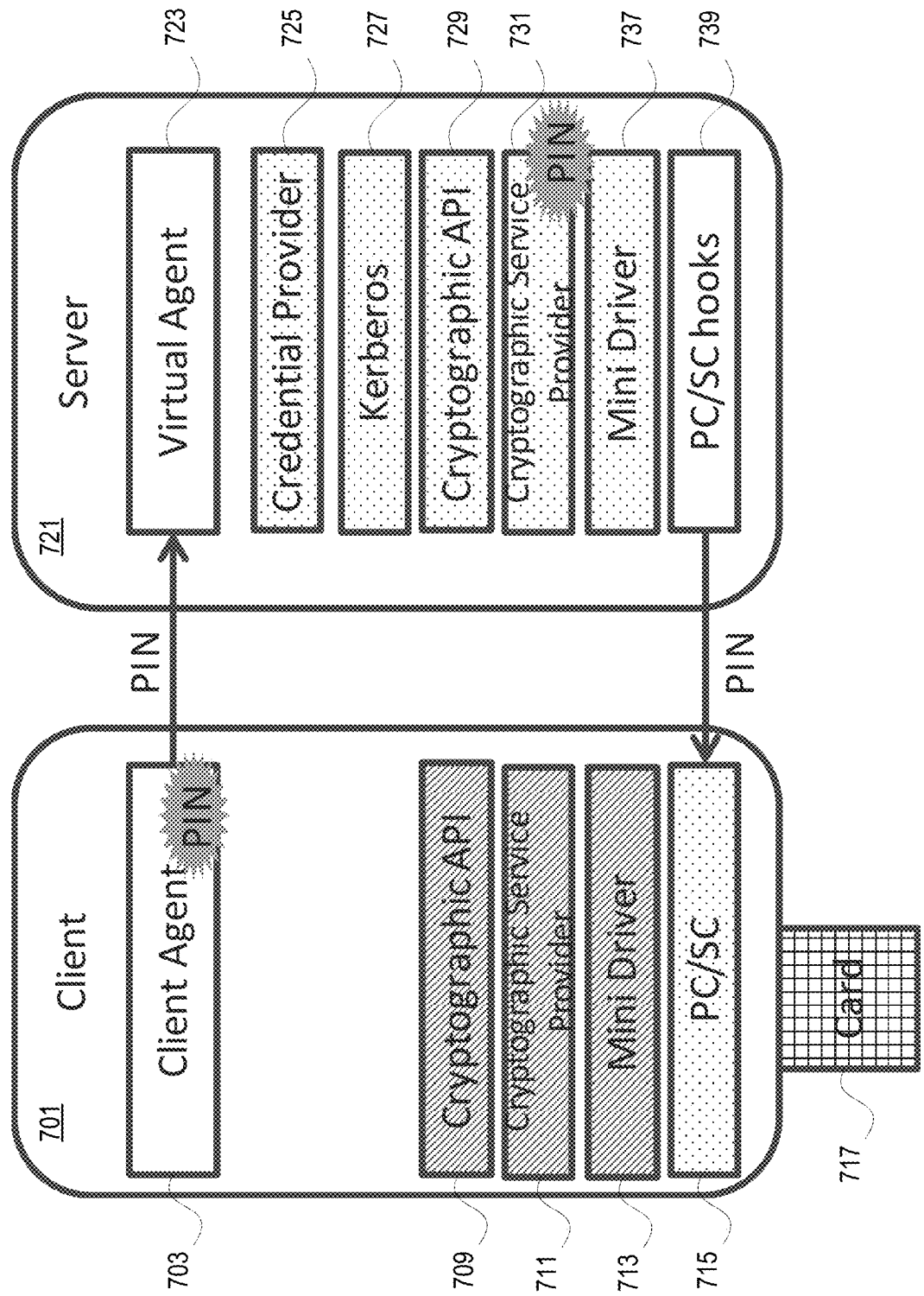
FIG. 7 depicts an illustrative system for smart card logon in accordance with one or more illustrative aspects described herein.

FIG. 7 depicts an illustrative system for smart card logon in accordance with one or more illustrative aspects described herein. As previously discussed, the client device 701 illustrated in FIG. 7 may interact with the server 721 also illustrated in FIG. 7 for authentication and for the server 721 to provide remote application services. For example, the client device 701 may include a client agent 703, such as a virtual machine program or application used to display application output generated by an application remotely executing on the server 721 or other server.

The client device 701 may include a cryptographic application programming interface 709 (CAPI) that enables applications to encrypt or sign data, a cryptographic service provider 711 (CSP), and a mini driver 713. In some embodiments, the CAPI 709, CSP 711, and mini driver 713 might not be used by the client device 701 during smart card logon.

The server 721 may include a virtualization agent (or virtual agent) 723. The server 721 may also include a credential provider 725, Kerberos module 727, CAPI 729, CSP 731, and mini driver 737. The server 721 may use these components to authenticate the client device 701 and/or for the client device 701 to sign data. Each of the client device 701 and the server 721 may also include a low level Personal Computer/Smart Card (PC/SC) layer 715 or 739 used for smart card integration. The smart card 717 may by physically connected to the client device 701, as illustrated in FIG. 7. The client device 701 may additionally or alternatively use a virtual smart card, as will described in further detail below.

In some aspects, the user may be prompted for a personal identification number (PIN) or other credential for authentication. The client agent 703 may capture the PIN, optionally store the PIN, and send the PIN, over a network connection, to the virtual agent 723 at the server 721. The CAPI 729 at the server 721 may comprise third party or public APIs. Moreover, drivers for smart card authentication may be on the server side, which may enable inter-operating system compatibility. The cryptographic service provider 731 on the server side may store (e.g., cache) the PIN received from the client device 701. During the authentication process, the server 721 may send the PIN back to the client device 701 via the PC/SC layer 739 in order to obtain credentials, such as one or more certificate, from the smart card 717 at the client device 701. During the smart card interactions at the PC/SC layer 715 and 739, the client device 701 and server 721 may interact hundreds of times, such as on the order of 500 round-trip requests. A second method for fast smart card login may reduce the number of times that the client device 701 and server 721 interact during smart card authentication, such as one, two, or three interactions, as will now be described.

Figure 8:
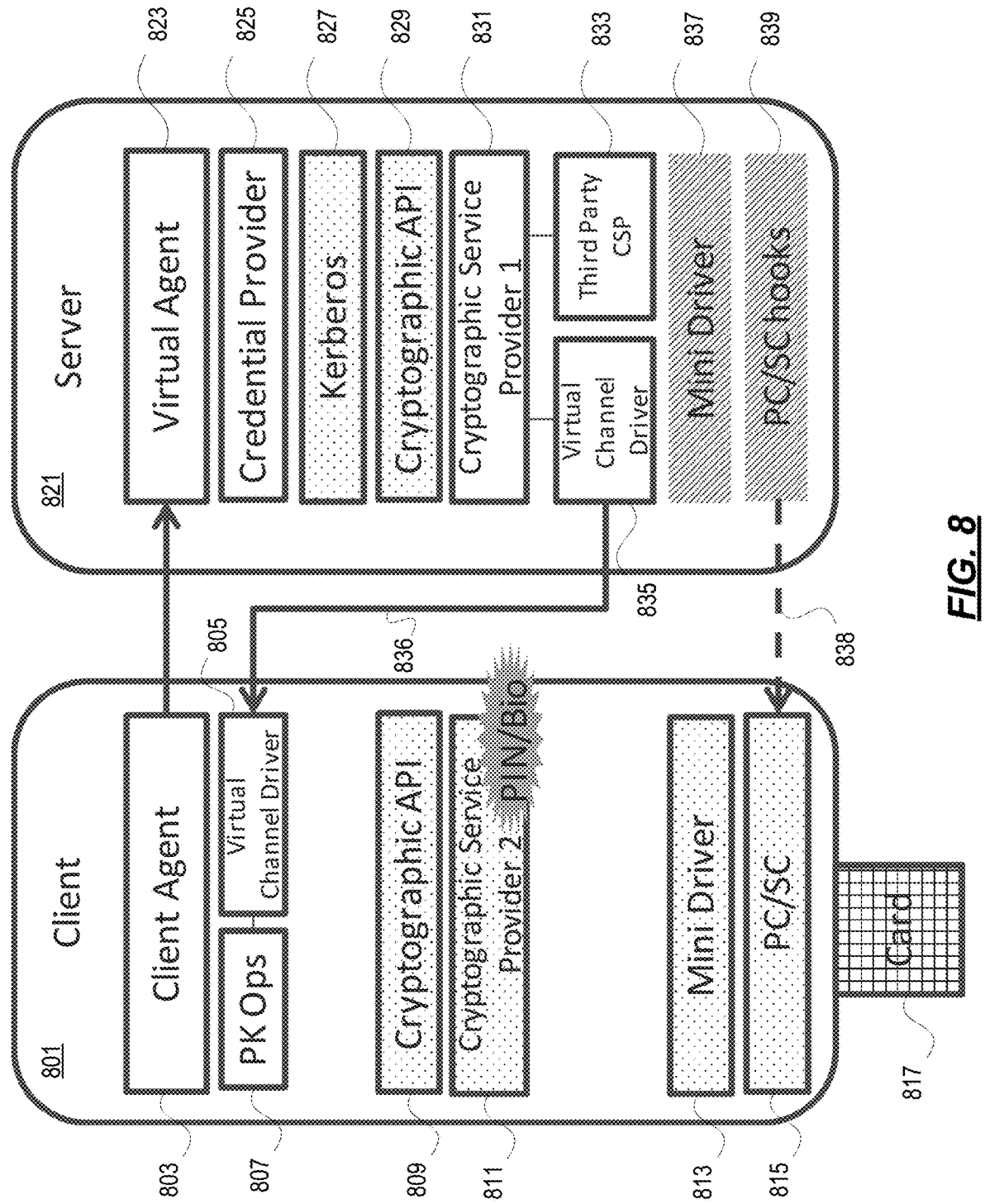
FIG. 8 depicts an illustrative system for fast smart card logon in accordance with one or more illustrative aspects described herein.

FIG. 8 depicts an illustrative system for fast smart card logon in accordance with one or more illustrative aspects described herein. Fast smart card logon may involve interactions between the client device 801 and the server 821 at a higher communication level (e.g., a domain logon with client certificate), rather than the PC/SC level 815 and 839. This may reduce the number of interactions between the client device 801 and the server 821 and/or the amount (e.g., volume) of data exchanged between the client device 801 and server 821.

As previously discussed with respect to FIG. 7, the client device may include a client agent 803, a CAPI 809, a CSP 811 (e.g., CSP 2 illustrated in FIG. 8), a mini driver 813, and the PC/SC 815. However, the client device may use its own CAPI 809, CSP 2 811, and mini driver 813 for smart card authentication, rather than relying on the server's CAPI 829, CSP 831, and mini driver 837. A smart card 817, which may be a biometric smart card (or any other smart card), may also be physically connected to the client device 801. The smart card 817 may store credentials, such as certificates.

The client agent 803 may establish a negotiation session with the virtual agent 823 of the server 821, via a display remoting connection to the virtual agent 823. During the negotiation session, the server 821 (e.g., the virtual agent 823 of the server 821) may determine whether to perform a traditional smart card logon or a fast smart card logon. As noted above, the fast smart card logon may involve fewer interactions between the server 821 and the client device 801. The client device 801 and server 821 may announce their capabilities to one another during the negotiation session.

The virtual agent 823 may also determine whether the client agent 803 provided the virtual agent 823 with automatic logon credentials. During a brokering step, the client device 801 may have authenticated with another (e.g., authentication) server, and the user may have provided a password, PIN, biometrics, or other credentials. The smartcard 817 may have been used during the brokering step, and the smartcard 817 may have been unlocked if the authentication with the first server was successful. The brokering step and smartcard unlock step may occur before the negotiation session between the client agent 803 and the virtual agent 823 or may occur during the negotiation session between the client agent 803 and the virtual agent 823. Accordingly, the virtual agent 823 may determine during the negotiation session that auto logon credentials were provided by the client agent 803. In some aspects, the virtual agent 823 may determine to use fast smart card logon if future PIN (or other credential) prompts at the client might be beneficially blocked, such as if auto logon credentials were provided. Otherwise, the virtual agent 823 may determine to use traditional smart card logon (e.g., smart card authentication via the PC/SC layer).

The server 821 may consider one or more other factors to determine which logon scheme to use. For example, the server 821 may determine to use fast smart card logon if the client device 801 indicates (e.g., during the negotiation session) that the client device 801 prefers to use fast smart card logon (e.g., smart card authentication). The server 821 may also determine whether it is capable of performing fast smart card logon. In some aspects, the server 821 may determine whether to perform fast smart card logon based on the number of user prompts for the PIN. For example, the server 821 may determine to use fast smart card logon if one or fewer user PIN prompts will occur (e.g., once during the brokering step or once during the brokering step and the negotiation step). Any other threshold number of PIN prompts may be used. Otherwise, the server 821 may determine not to use the fast smart card logon scheme.

After the user provides a PIN or other credential (e.g., a biometric), the CSP 811 of the client device 801 may store (e.g., cache) the PIN, biometric, or other credential, or otherwise keep the smart card unlocked for further use by the client device 801. By storing the PIN or biometric at CSP 2 811, the client device 801 may communicate directly with the smart card 817 to obtain security certificates, rather than the CSP 831 of the server 821 communicating with the smart card 817 to obtain certificates, as illustrated in FIG. 7. Accordingly, the PIN or biometric may remain on the client device 801 rather than being transmitted (sometimes multiple times) between the client device 801 and server 821 over a network that may or may not be secured. In alternative embodiments, the client agent 803 may send the PIN or biometric to the server 821. The server 821 may store the PIN or biometric at, for example, the CSP 833, as will be described in further detail below. In the example of biometrics (e.g., a fingerprint), smart card authentication may be significantly sped up (relative to other smart card authentication schemes) due to the large amount of data used for fingerprints or other biometrics.

The client device 801 may also include a Private Key Operation (PKOperation) SDK module 807 configured to process certificate operations, such as with the smart card 817. The functionality of the PKOperation SDK 807 is described in co-pending non-provisional U.S. patent application Ser. No. 13/886,845, which is hereby incorporated by reference in its entirety. In particular, the PKOperation SDK module 807 of the client device 801 may facilitate access to a keystore that stores one or more client certificates with corresponding private keys that may be used to sign for authentication purposes. For example, the client device 801 may authorize access to or have possession of a client certificate representing the user of the client device 801. In some aspects, the certificate may be an enterprise-issued certificate. The certificate may be bound to a physical smart card having a cryptographic module. In other words, the cryptographic secret may be confined to the smart card. The user may authorize the client device 801 to access the smart card protected certificate.

Alternatively, the certificate may be bound to a derived credential (e.g., a virtual smart card), which may use hardware and/or software modules to protect the key. The certificates in the derived credential may be stored at the client device 801 and may be accessed similar to the certificates on a physical smart card 817. The certificates from the derived credential may be stored in a trusted environment at the client device 801.

The client device 801 and/or a removable hardware module of the client device may be authorized by a provisioning process to store the certificate and private key. The user may be requested to enter a PIN or other credential (e.g., a biometric) using the client device 801 to authorize operations involving the client certificate private key. Another external device separate from the client device 801 (e.g., a smartphone) may control the certificate, and the client device 801 may utilize a custom reader interface to access the certificate controlled by the external device.

Turning now to the server 821, the server 821 may include the virtual agent 823 and a CAPI 829, as previously discussed above and with respect to FIG. 7. The server 821 may include a CSP 831, but might not utilize the CSP 831 for smart card authentication. Rather, the client-side CSP 811 might be utilized instead. The server 821 may also include one or more credential providers, including a credential provider 825 (or a credential provider filter) configured to initiate smart card logons. The virtual agent 823 may select the credential provider to use for fast smart card logon, such as the credential provider 825. If Kerberos authentication is utilized, the credential provider 825 may communicate with a trusted third party device 827 (e.g., a Kerberos module), as will be described in further detail in the examples below.

The server 821 may include a cryptographic service provider CSP 831 and/or (optionally) a key storage provider (KSP), which is not illustrated. In other words, the CSP 831 may be replaced by a KSP. A KSP may be used to support alternative smart card algorithms that might not be supported by the CSP 831. Similarly, the CSP 811 on the client device 801 may be replaced by a KSP. The CSPs (and/or KSPs) may be configured to intercept certificate operations. The credential provider 825 may select the CSP to use for fast smart card logon, such as CSP 831. The CSP 831 (and/or a KSP) at the server 821 may communicate with the PKOperation SDK 807 at the client device 801 via a remoting channel 836. For example, a virtual channel 836 between the client device 801 and the server 821 may be established by the virtual channel driver 805 of the client device 801 and the virtual channel driver 835 of the server 821.

Operations using the client device 801, such as a request for a certificate from the smart card 817 or a request to sign data, may be sent from the CSP 831 (and/or a KSP) at the server 821 to the PKOperation SDK 807 at the client device 801 (e.g., via the virtual channel 836). By communicating at a higher level (e.g., via the virtual channel 836 rather than PC/SC tunnel 838), the server and client device pair illustrated in FIG. 8 may communicate fewer times and/or less information to one another than the server and client device pair illustrated in FIG. 7, reducing potential latency.

The server 821 may also comprise a CSP 833, such as a third party CSP, for server-side authentication operations that do not involve communicating with the client device 801 (or the smart card 817). As previously discussed, the server 821 may also include a Mini Driver 837 and PC/SC hooks 839. In some aspects, the Mini Driver 837 and PC/SC 839 might not be used for client device authentication. In other aspects, the PC/SC 839 may communicate with PC/SC 815 at the client device 801 via another virtual channel 838.

General operations for authentication using a smart card 817 via Kerberos will now be described in further detail. The server credential provider 825 may use the KERB_CER- TIFICATE_LOGON structure to trigger a logon, such as an Active Directory logon, with a smart card class user certificate. The server credential provider 825 may use the KERB_CERTIFICATE_LOGON structure. The KERB_CERTIFICATE_LOGON structure may comprise the following:

```
typedef struct _KERB_CERTIFICATE_LOGON {
  KERB_LOGON_SUBMIT_TYPE   MessageType;
  UNICODE_STRING           DomainName;
  UNICODE_STRING           UserName,
  UNICODE_STRING           Pin;
  ULUNG                    Flags;         ⎫
  ULUNG                    CspDataRength; ⎬
  PUCHAR                   CspData;       ⎭  KERB_SMARTCARD_CSP_INFO
  KERB_CERTIFICATE_LOGON, *PKERB_CERTIFICATE_LOGON;
```

Furthermore, as described in the KERB_CERTIFICATE_LOGON structure, "CspData" may compromise a pointer to a KERB_SMARTCARD_CSP_INFO structure. The KERB_SMARTCARD_CSP_INFO structure may comprise the following:

```
typedef struct _KERB_SMARTCARD_CSP_INFO {
  DWORD dwCspInfoLen;
  DWORD MessageType;
  union { PVOID ContextInformation; ULONG64 SpaceHolderForWow64; };
  DWORD flags;
  DWORD KeySpec;
  ULONG nCardNameOffset;
  ULONG nReaderNameOffset;
  ULONG nContainerNameOffset;   ⎫  Name of CSP to use for (some/all?)
  ULONG nCSPNameOffset;         ⎭  PKINIT crypto operations
  TCHAR bBuffer;
} KERB_SMARTCARD_CINFO, *PKERB_SMARTCARD_CSP_INFO;
```

The structure may be generated by the server credential provider 825. In particular, the structure may identify, for example, the name of the CSP 831 and/or a KSP.

As described in further detail in U.S. patent application Ser. No. 13/886,845, which is incorporated herein by reference, Kerberos resource authentication may involve obtaining service tickets from Kerberos KDCs (e.g., Active Directory domain controllers). For example, the Kerberos authentication package in the server 821 may use the Public Key Cryptography for Initial Authentication in Kerberos (PKINIT) protocol, such as is described in Request for Comments (RFC) 4556 to perform the Active Directory logon.

During processing of information by the server credential provider 825, the Kerberos module 827, or another application using the smart card, the CSP 831 and/or KSP at the server 821 side may intercept the relevant certificate operations performed by the credential provider 825 and the Kerberos module 827 and remote those operations to the client device 801 (e.g., the PKOperations SDK 807 at the client device 801). For example, if the CSP 831 and/or KSP detects a certificate request or a data signing operation, the CSP 831 and/or KSP may package authentication data and send a request to the client device 801 for the certificate and/or the signature. Otherwise, operations that do not use client information may generally be performed at the server 821 (e.g., via the third party CSP 833) without involving the client device 801, reducing the amount of data exchanged between the client device 801 and the server 821 and the number of times the client device 801 and the server 821 interact. Exemplary operations that are remoted to the client device 801 include, but are not limited to, a request to list (e.g., enumerate) the certificates on the smart card 817, a request for a certificate, sign operations using the private key of the smart card 817, and decrypt operations using the private key of the smart card 817. Exemplary operations that might not be sent (e.g., remoted) to the client device 801 (e.g., may be performed by the third party CSP 833 or otherwise at the server 821) include, but are not limited to, context and handle management, parameter collection and handling, random number generation, symmetric key generation and derivation, bulk encryption and decryption, hashing data to produce message digests, wrapping a session key, signature verification, and certain other operations.

The CSP 831 and/or KSP may also supply context information, such as PKINIT context information, to the client device 801 with its request for a certificate, for the client 801 to sign or decrypt data, or for any other operation involving the client device 801. Supplying context information is discussed in further detail in U.S. patent application Ser. No. 13/886,845, which is incorporated herein by reference in its entirety. Supplying context information may safeguard against misuse of the remoting channel 836 between the server 821 and the client device 801 (established via the virtual channel drivers 805 and 835).

An exemplary signing operation will now be described. Kerberos module 827 may make calls to CSP 831 during logon to indicate, for example, that the client device's signature is desired. For example, and as described in further detail in U.S. patent application Ser. No. 13/886,845, the Kerberos module 827 may make calls to sign an AuthPack to be signed during PKINIT:

| | |
|---|---|
| CryptCreateHash ⎫ | Computing hash of PKINIT AuthPack structure |
| CryptHashData ⎬ | as part of generating signature |
| CryptGetHashParam ⎭ | |
| CryptSignHash } | Actual signing of AuthPack with private key |

The smart card 817 private key may be used by the client device 801 to sign the AuthPack structure. The signing may be done using the Cryptographic Message Syntax (CMS) described in RFC 5652. In particular, the AuthPack may be placed in SignedData envelope, as described in RFC 5652. Accordingly, the signing operation may be recognizable at the CSP level, because raw data passed to hash function calls may have well-formed ASN.1 structures as defined in RFC 4556 and 5652, and discussed in further detail in U.S. patent application Ser. No. 13/886,845, the discussion of which is hereby incorporated by reference. In some aspects, the operations remoted to the client device 801 (e.g., signing and decryption) might not indicate the protocol context (e.g., an ASN.1 or other recognizable structure). Accordingly, these operations may be provided without providing proof of the protocol context giving rise to these operations.

As explained above, the client device 801 may receive one or more requests from the server 821 during the authentication process. The processes on the client device 801 may communicate via one or more interprocess communication (IPC) mechanism. Moreover, each process may determine which other process is calling the first process, which may be used to determine whether to prevent excess PIN prompts (or other credential prompts) during authentication. If a process has already unlocked the smart card 817, one or more subsequent PIN prompts may be blocked so that the user does not have to provide the PIN again. However, if a process has not used the smart card 817, the user may be prompted for the PIN. The client agent 803 may be made up of multiple processes, even though it may logically comprise one application (from the user's perspective). One of those processes might be authorized to use the smart card (and the others might not be authorized) because of prior authentication during brokering, and therefore the client device 801 may route these additional smart card operations from the client agent logon step back to the first process to avoid more PIN prompts.

On the other hand, additional PIN prompts may occur in some circumstances. Whether the client device 801 prompts the user again for the user's PIN (or other credential) may depend on which process is calling for the smart card PIN. In some aspects, the user may authorize each application that wants to use the smart card. This may be implemented by the operating system and the CSP, such that the unlocked smart card is not necessarily usable by other processes for what may be a different purpose than the first process which caused a PIN prompt and therefore obtained user authorization. In some cases, the smart card itself may have an internal policy that forces a PIN prompt.

In some aspects, the authentication method previously discussed may be implemented on a CSP (e.g., CSP 831) and/or a KSP. If a CSP or a KSP is used, hash functions might not be used. In general, many of the CSP functions may be delegated to a standard CSP (e.g., the third party CSP 833), except operations using the client device 801, such as CpSignHash and CpDecrypt. In some embodiments, if the Kerberos module 827 also fetches a user certificate to put in an AS-REQ packet, the Kerberos module 827 may call a CryptGetKeyParam to read the user certificate. Accordingly, the CryptGetKeyParam may trigger the CSP 831 to request the user certificate from the client device 801.

After performing the operation remoted to the client device 801 (e.g., one, two, three, or four operations), the Kerberos system 827 may complete its authentication to a domain controller, completing a basic operating system logon.

The server 821 may support smart card removal policies. In some aspects, there may be another virtual channel 838 between the client-side PC/SC 815 and the server-side PC/SC 839. The server 821 can see the smart card layer using this virtual channel 838, and therefore be able to determine when the smart card 817 has been removed. In this example, the credential provider 825 may confirm that the correct smart card reader name is listed in a data field, such as KERB_SMARTCARD_CSP_INFO, so that it matches the information exposed by the PC/SC virtual channel 838. In other aspects, the PC/SC virtual channel 838 might not be used. Instead, the server 821 may determine the status of the smart card 817 using the virtual channel 836 between the server-side CSP 831 and the client-side PK Ops 807. For example, the client device 801 may determine the status of the smart card 817, and the status may be sent by PK Ops 807 to the CSP 831 via the virtual channel 836. The server 821 may generate and store a virtual smart card reader (not illustrated) that emulates the status of the smart card 817. The server 821 may determine the status of the smart card 817 by determining the status of the virtual smart card reader at the server 821. The server 821 may perform various actions after it determines that the smart card has been removed. For example, the server 821 may lock the session to leave it secure if the user moves away from his or her access terminal. This may avoid the user needing to do anything other than to carry their card with them.

Figure 9:
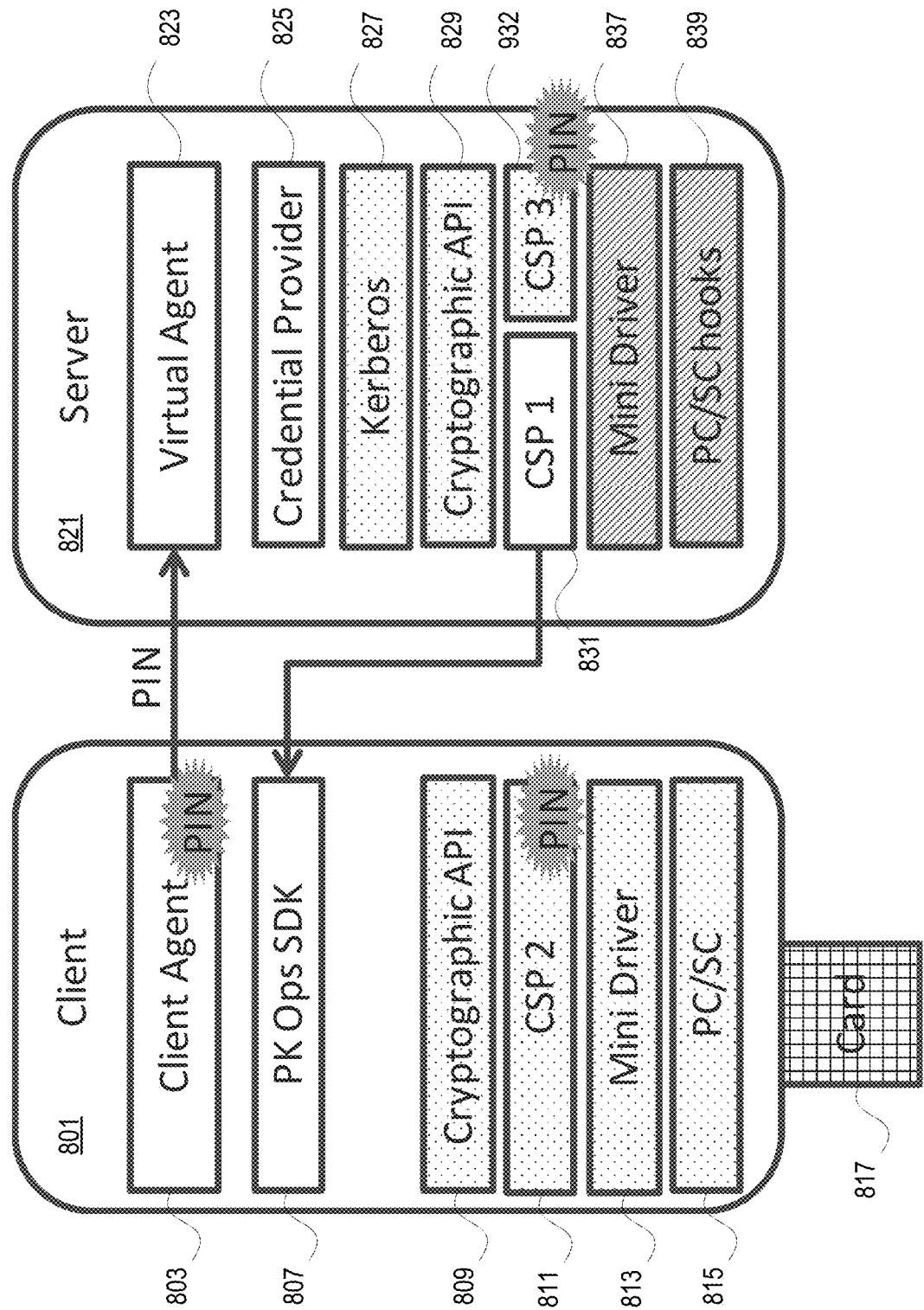
FIG. 9 depicts another illustrative system for fast smart card logon in accordance with one or more illustrative aspects described herein.

FIG. 9 depicts another illustrative system for fast smart card logon in accordance with one or more illustrative aspects described herein. The system illustrated in FIG. 9 may comprise an extension of the system illustrated in FIG. 8 and support ancillary third-party (e.g., vendor) CSP functions. In addition to the components illustrated in FIG. 8, the server 821 in the example of FIG. 9 may include a third-party CSP, CSP 932. In some aspects, the CSP 932 may be the CSP 731 illustrated in FIG. 7. Both CSPs may store the user's PIN or biometric. In this example, the client device 801 may send the PIN (or other credential) to the server 821. The PIN (or other credential) may be protected during transmission by, for example, a key negotiation between the client device 801 and the server 821, such as Diffie-Helman. The key negotiation may occur inside the PK Ops virtual channel, in addition to any lower level transport security mechanism, such as TLS. Upon receipt of the PIN (or other credential), CSP 932 may store (e.g., cache) the PIN. By storing the PIN, CSP 932 may unlock the smart card 817 for application use after logon (e.g., applications running in an interactive server session and/or for other similar functions). Exemplary applications in a virtual session may include web browsers, productivity software, email clients, and the like. Moreover, CSP 932 might not be directly used during logon, so storage of the PIN at CSP 932 might have little or no effect on logon performance (e.g., speed, latency, security, etc.). Storing the PIN at CSP 932 may be used for single sign on for applications running in the interactive server session. For example, the applications may directly access the PIN from CSP 932 to sign on the user.

In some embodiments, applications running in the interactive server session, such as a web browser, applications utilizing document signing, or other applications, may access smart card credentials for log on. The operations described herein may be used for applications accessing smart card credentials. In these examples, the server-side Kerberos component 827 may be replaced with the application requesting access to the smart card, and the operations for accessing the smart card credentials may be performed as described above. Moreover, the user certificate obtained using the virtual channel 836 may be propagated to a certificate store for the user session, such as a WINDOWS or other OS certificate store. The OS may perform this operation for normal smart card logons, as a background process that uses the PC/SC API. Accordingly, the certificate may be linked to CSP 831, rather than the normal CSP for the card (e.g., CSP 932 illustrated in FIG. 9).

When the server-side Kerberos component 827 is replaced with the application requesting access to the smart card, the CSP 831 (and the PK Ops SDK, and other components) may distinguish between the different applications on the server side if user authorization per application is desired. PIN prompting might not occur automatically because different server-side applications may attempt to use the card, and private key operations may be flowing back to the client-side process that is already authorized. Therefore, the CSP 831 may indicate the PIN prompting policy used by the server 821 so that the private key operations may be performed by the client 801. In some cases, this might happen by exposing the concept of smart card operations supported by the server-side CAPI 829 so that the operations can be mirrored to the CAPI 809 on the client 801.

In some embodiments, the smart card might not yet be unlocked and an interactive PIN prompt may be used. In these embodiments, the PIN prompt may be handled by the server 821 rather than the client 801. Collecting the PIN on the server 821 might be less secure than collecting the PIN on the client 801. However, the server implementation may be easier in this case because the core security system (e.g., LSA on WINDOWS) might not be blocked as it waits for user input as it might otherwise be. The speed benefits of PKOps remoting (rather than PC/SC), as described above, may be present in these embodiments. As a brief example, this mode may be used for unlocking the remote session if it was locked by a removal of the smart card, but the session was not disconnected. When the user reinserts the smart card, the smart card insertion may be signaled (e.g., via PC/SC or the PK Ops virtual channel), and the user may be prompted to enter a PIN to unlock the card.

Figure 10:
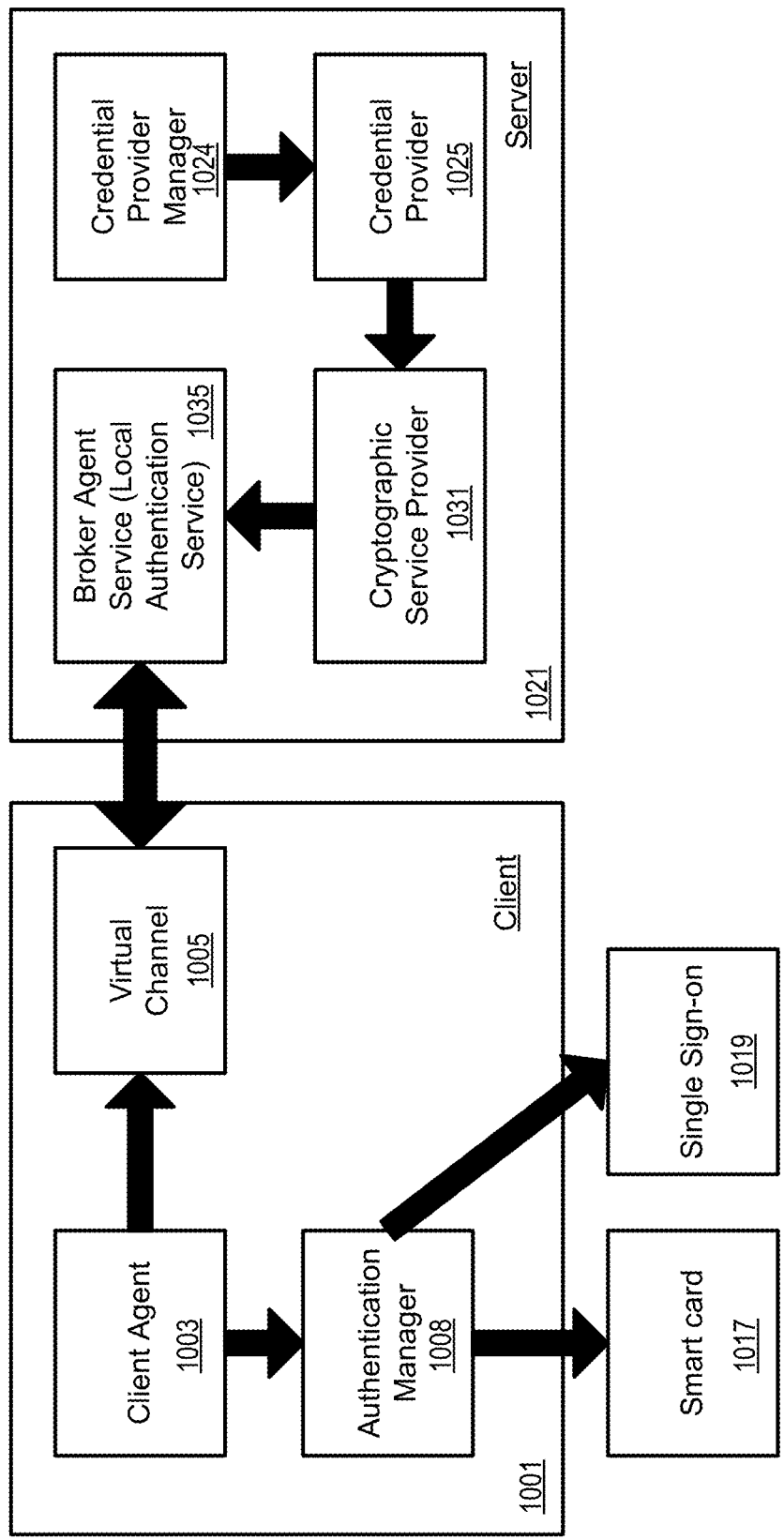
FIG. 10 depicts yet another illustrative system for fast smart card logon in accordance with one or more illustrative aspects described herein.

FIG. 10 depicts yet another illustrative system for fast smart card logon in accordance with one or more illustrative aspects described herein. The client device 1001 may include a client agent 1003, as previously discussed. The client device 1001 may communicate with the server 1021 via one or more virtual channels 1005. The client device 1001 may also include an authentication manager 1008, which may comprise one or more of the client device's CAPI, CSP 2, and/or mini driver modules previously discussed with reference to FIG. 8. The authentication manager 1008 may be a module in the client agent 1003 that implements the PKOperation SDK illustrated in FIG. 7 and FIG. 8 (and previously discussed). Depending on the client device's operating system, the authentication manager 1008 may use an operating system-provided CAPI or may include its own CAPI. The authentication manager 1008 may communicate with a smart card 1017 and/or a single sign-on device 1019, such as a secure PIN caching service and/or device. The authentication manager 1008 may store a PIN or other credential provided by the user during authentication. Fast smart card logon may rely on a new IPC channel for the client device 1001 to communicate with the authentication manager to access new authentication-focused smart card certificate services.

The server 1021 may include a broker agent service 1035, which may interface with the virtual channel 1005 between the client device 1001 and the server 1021. For example, the broker agent service 1035 may comprise the virtual channel driver 835 illustrated in FIG. 8. The broker agent service 1035 may facilitate authentication. The server 1021 may include a Cryptographic Service Provider CSP 1031 and a credential provider 1025 (e.g., a certificate credential provider), as previously discussed with reference to FIG. 8. The server 1021 may also include a credential provider manager 1024, which may comprise the virtual agent 823 previously described. The credential provider manager 1024 may be used to determine whether to use smart card login (e.g., the embodiment illustrated in FIG. 7) or fast smart card login (e.g., the embodiment illustrated in FIG. 8) for authentication.

Authentication steps that may be performed by the components illustrated in FIG. 10 will now be described. First, a virtual channel 1005 between the client device 1001 and the server 1021 may be established. The client device 1001, such as via the client agent 1003, may negotiate with the server 1021, such as via the credential provider manager 1024, to determine the credential provider 1025 to use. In some examples, the server 1021 may have multiple credential providers 1025 and/or otherwise interact with multiple credential providers. Moreover, the client agent 1003 may negotiate with the credential provider manager 1024 to determine whether to use smart card login or fast smart card login. The client agent 1003 may notify the server 1021 that the client device 1001 wishes to authenticate using smart card or other credentials.

If the credential provider manager 1024 on the server 1021 detects that fast smart card logon should be used (e.g., enabled), a credential provider 1025 may be triggered. In other words, the credential provider manager 1024 may notify a particular credential provider 1025 to perform a smart card login procedure. This trigger may notify a domain logon process (e.g., WinLogon.exe) to authenticate using a certificate found in the CSP 1031. The CSP 1031 may direct operations involving the client device 1001, such as certificate retrieval and signing operations, to the client 1001, while performing other cryptographic functions locally on the server 1021. As previously discussed with reference to FIG. 8, the credential provider 1025 may communicate with a Kerberos module for authentication. During the operations between the credential provider 1025 and the Kerberos module, the CSP 1031 may be called to perform certificate operations and/or signing operations (or other operations using information stored at the client device 1001). The CSP 1031 may communicate with the authentication manager 1008 at the client device 1001 via the broker agent service 1035 on the server side and the virtual channel 1005 on the client side in order to obtain the desired client or user information.

After the client device 1001 receives a request for information, user interface interactions, including selecting certificates and requesting PINs, may be handled by the authentication manager service 1008 on the client device 1001. The virtual channel (as previously discussed) may be used rather than the existing smart card virtual channel (e.g., PC/SC) if smart card logon is enabled. In some aspects, the client device 1001 may interactively prompt the user for input (e.g., to select a certificate, to enter a PIN or biometric, etc.) in order to perform the operations requested by the server 1021. For example, the user interaction steps may occur early on during the client agent connection, before the credential provider is triggered.

The following operations or commands may be used to choose between smart card login or fast smart card login:

| Policy Identifier | Description |
| --- | --- |
| POLICY_VIRTUAL_CHANNEL_DISABLED | Administrator has explicitly disabled the fast smartcard auth virtual channel (client or server end) |
| ICAFILE_DISABLE_CTRL_ALT_DEL | Individual client agent files indicate that smartcard logon should be used for connections by setting this to true. |
| POLICY_SMARTCARD_DISABLED | Disabling the old smartcard virtual channel will *not* disable the fast smartcard virtual channel. |
| POLICY_USE_LOCAL_USER_AND_PASSWORD | Disabling PIN pass-through will no longer force the user to enter a smartcard PIN when authenticating to the VDA (that is if they have previously unlocked it using the Authentication Manager) |

Steps in the logon sequence may be controlled by the authentication manager service 1008 on the client device 1001, which may decide whether to prompt the user for information via a graphical user interface (GUI). At start up, the client agent 1003 may load a virtual channel which may proceed to decide whether to enable the fast smartcard virtual channel. Fast smartcard virtual channel may be enabled if POLICY_VIRTUAL_CHANNEL_DISABLED is false, ICAFILE_DISABLE_CTRL_ALT_DEL is true, and Authentication Manager Service IsCertificateLogonEnabled( ) is true. IsCertificateLogonEnabled( ) may be true if POLICY_VIRTUAL_CHANNEL_DISABLED is false and a smartcard device is detected.

The credential provider manager 1024 at the server 1021 may also perform activation steps. For example, the credential provider manager 1024 may attempt a smart card logon if ICAFILE_DISABLE_CTRL_ALT_DEL is true. At this point, the credential provider manager 1024 may attempt to use the fast smart card authentication virtual channel if POLICY_VIRTUAL_CHANNEL_DISABLED is false, the virtual channel has been enabled by the client device 1001, and the credential provider manager 1024 can retrieve the logon certificate via a virtual channel GetCertificate( ) call (e.g., for the client device 1001 to retrieve a certificate). Otherwise, the existing smart card virtual channel (to enable smart card logon, rather than fast smart card logon) may be activated.

Client device components may respond to a GetCertificate( ) call. Assuming that the virtual channel was enabled, GetCertificate( ) requests may be passed from the server 1021 directly to the client device's authentication manager service 1008. The authentication manager service 1008 may return a certificate to the server 1021 after it verifies that POLICY_VIRTUAL_CHANNEL_DISABLED is false, a smart card device is present, and the certificate has an appropriate format (e.g., satisfies a policy for type of certificate). If needed, the authentication manager service 1008 may prompt the user to insert a smart card 1017 or select a certificate if a smart card was not detected and/or if there are multiple certificates available of the appropriate format.

The credential provider 1025 and CSP 1031 at the server 1021 may perform various steps. If the credential provider manager 1024 receives a certificate, it may invoke the credential provider 1025 and send a cryptographically random CSP access ticket to the credential provider 1025. The CSP 1031 may perform an interactive logon using certificate functions provided by the local authentication service of the broker agent service 1035. For example, the local authentication service 1035 may verify that the CSP caller knew the access ticket before using the virtual channel to perform SignHash( ) or other operations.

Client device components may respond to a SignHash( ) operation. Assuming that the virtual channel was enabled, SignHash( ) requests may be passed directly to the authentication manager service 1008 of the client device 1001. The authentication manager service 1008 may sign hashes if POLICY_VIRTUAL_CHANNEL_DISABLED is false, the certificate was the one selected by the user, and a PIN is available from the single sign-on service, or a previous smartcard session exists (e.g., from a prior step when user authenticated to another service), or if the user supplies the correct PIN or other credential used to unlock the smart card 1017, such as a fingerprint or other biometric.

Fast smart card may be integrated (e.g., fully integrated) with one or more operating systems and may provide an expected end-user experience. Integration of fast smart card logon with the operating system may result in an end-user experience that is the same or similar to a scenario where the smart card was used locally (e.g., without a remote session protocol). For example, an executable or other program on the client device (e.g., WINDOWS LogonUI) may be used to prompt the user for a smart card PIN or other smart card credentials in order to access one or more resources. Aspects described herein may allow a user to logon to a remote session interactively by providing the smart card PIN or other credentials to the operating system, for example, via a logon user interface program (e.g., LogonUI). Aspects described herein may allow a user to unlock a remote session by providing the user's smart card credentials to the operating system, for example, via the logon user interface program. Accordingly, the user might not have to disconnect the remote session when it is locked and then use single sign on to reconnect. Aspects described herein may allow the use of an in-session application that may use standard queries to a resource manager to discover the smart card associated CSP, such as via calls to various PC/SC functions, such as the PC/SC SCardListCards function, the PC/SC SCardGetCardTypeProviderName function, or other functions.

In some aspects, one (or a plurality of) proxy smart cards may be used to integrate fast smart card with one or more operating systems, such as WINDOWS, LINUX, etc. The proxy smart card might not be a real smart card (e.g., a real physical smart card). Instead, the proxy smart card may be generated at and/or known by one or more server-side components of a server, such as one or more components of the server 821 illustrated in FIGS. 8 and 9, the server 1021 illustrated in FIG. 10, or any other servers described herein. As previously explained, the client device 801 may be connected to the server 821 via a remote session protocol.

One or more proxy smart cards may be identified by a proxy smart card type identifier. The proxy smart card type identifier may indicate, for example, the type of smart card of the proxy smart card. The proxy smart card type identifier for the proxy smart card may be included in, for example, an Answer to Reset (ATR) message or file. The ATR of a proxy smart card, similar to real smart cards, may comprise a sequence of data (e.g., a sequence of bytes) that uniquely identifies the type of the smart card, which may be defined according to ISO 7816 specifications. The server may create one (or multiple) proxy smart card ATRs following the ISO 7816 format. In some aspects, the server may create the proxy smart card and its associated proxy smart card identifier at a time of installation, such as a virtual machine installation.

The generated proxy smart card identifier (e.g., an ATR) may be associated with a CSP (e.g., a fast smart card CSP), and the CSP may be used for cryptographic operations in some scenarios. The association between the proxy smart card identifier and the CSP may be stored on the server-side computer (e.g., server 821). For example, the server may include a database, and the association between the identifier (e.g., an ATR) and the CSP may be added to the database of the server. For WINDOWS operating systems, the association between the proxy smart card identifier and the corresponding CSP (e.g., a fast smart card CSP) may be added to a PC/SC Resource Manager Database. For example, the association may be added to a WINDOWS registry.

Figure 16A:
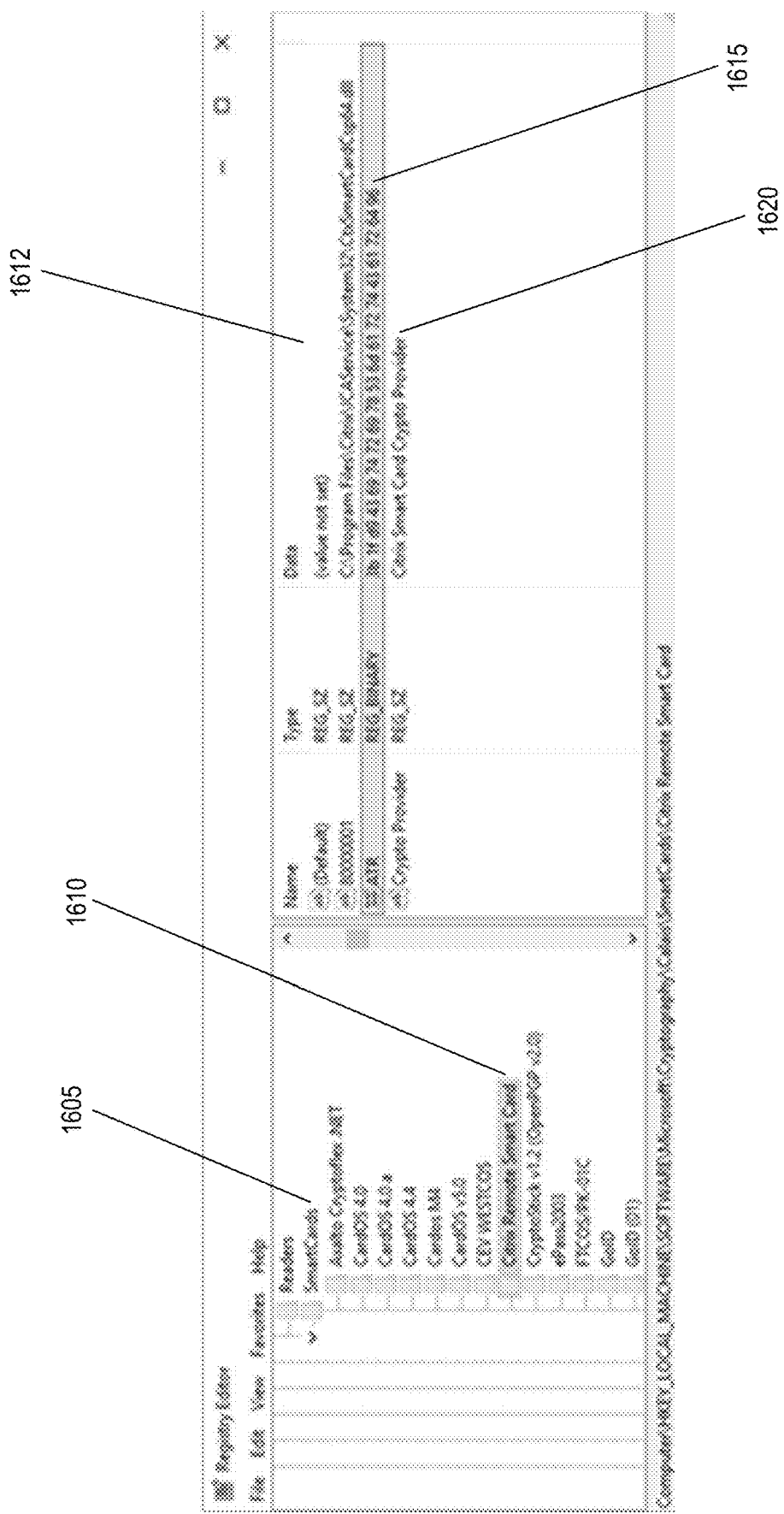
FIG. 16A depicts an illustrative database of smart cards in accordance with one or more illustrative aspects described herein.

FIG. 16A depicts an illustrative database of smart cards in accordance with one or more illustrative aspects described herein. The database (e.g., a smart card resource manager database) may be a registry and may comprise information for a plurality of smart cards 1605. For example, one of the smart cards may comprise a remote smart card 1610, which may be a proxy smart card generated and stored at the server side. The corresponding file 1612 for the remote smart card 1610 may include information for the remote smart card 1610, such as the smart card identifier 1615 (e.g., an ATR) and information identifying a CSP 1620. The smart card identifier 1615 and the information identifying the CSP 1620 may be stored in the same file (e.g., the remote smart card file). As illustrated, the remote smart card 1610 may have an ATR with a hexadecimal value (e.g., 3b if d9 43 69 74 72 69 78 53 6d 61 72 74 43 61 72 64 96). Other types of values, such as binary or ASCII values may be used to represent the ATR. The information identifying the CSP 1620 may comprise a name for (or other pointer to) the CSP, such as CITRIX smart card crypto provider. The name may point to a location in the database that indicates a path for the CSP (e.g., dynamic link library (DLL) data).

Figure 16B:
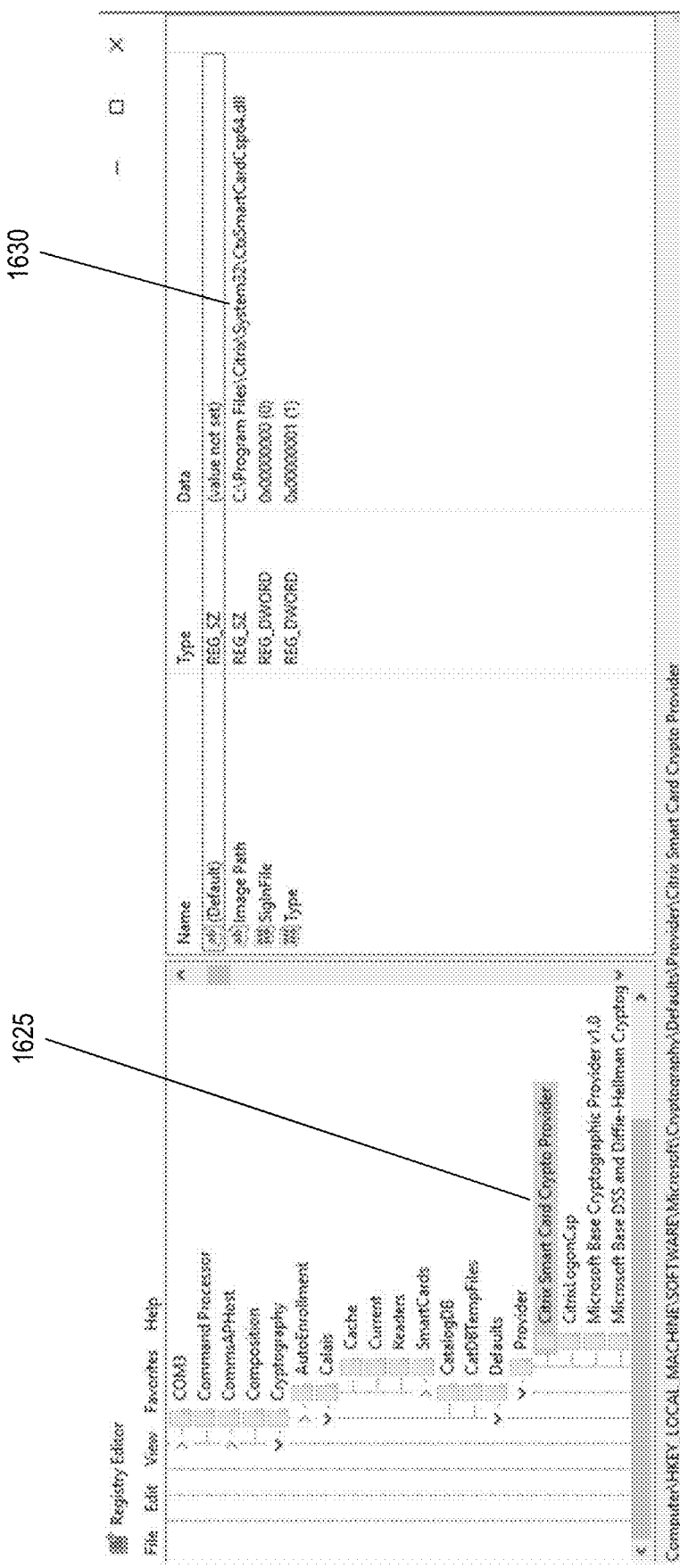
FIG. 16B depicts an illustrative database of smart cards in accordance with one or more illustrative aspects described herein.

FIG. 16B depicts an illustrative database of smart cards in accordance with one or more illustrative aspects described herein. As previously explained, the information identifying the CSP 1620 may comprise a name for the CSP, such as CITRIX smart card crypto provider. The name for the CSP may point to the location 1625 in the database. The location 1625 may comprise data, such as data 1630 that points to the location of the CSP. For example, the path to load (e.g., dynamically load) the CSP file (e.g., a DLL) may be C:\Program Files\Citrix\System32\CtxSmartCardCsp64.dll. In these examples, the database may associate the smart card identifier (e.g., an ATR) with the appropriate CSP.

With reference to FIG. 16A, other smart cards 1605 or types of smart cards may include the same or similar information as the smart card 1610. For example, each different type of smart card may have a different smart card identifier. Smart cards of the same type may use the same smart card identifier (e.g., ATR). Consequently, smart cards of the same type may use the same CSP. For example, some smart cards of the same type may have corresponding files that store the same identifier (e.g., ATR) and the same CSP identifier (e.g., a CSP name or other pointer for the CSP).

In some aspects, multiple proxy ATRs or other identifiers may be used. For example, a client device may be using multiple smart cards at the same time (or different times), and those smart cards may comprise different types of smart cards. The different types of smart cards may be associated with a single substitute ATR (or other identifier) and thus may use the same CSP (e.g., CSP 831 illustrated in FIG. 8). However, different CSPs may be used on the client side. For example, the client device 801 may include the CSP 811 to handle one type of smart card and another CSP (not illustrated in FIG. 8) to handle another type of smart card. The client device 801 may know which CSP to use. Each time there is a cryptographic operation request from the server 821 to client device 801, a field in the request may include the name of CSP to use on client side (e.g., CSP 811 or another CSP).

Additionally or alternatively, each different type of smart card may be associated with a different substitute ATR (or other identifier) and thus may use a different CSP at the server side. For example, CSP 831 illustrated in FIG. 8 may be used for one type of smart card, and another CSP on the server side (not illustrated in FIG. 8) may be used for another type of smart card. Different CSPs for different types of smart cards may be used in double up scenarios, such as authentication involving client 801 to server 821 and server 821 to another server (not illustrated in FIG. 8). The other server might not use the fast smart card functionality and may need to know the smart card type of the real smart card 817 in order to substitute back the ATR for the real smart card 817.

One or more examples described herein use fast smart card redirection of cryptographic operations and PC/SC redirection of some (e.g., initial) PC/SC functions. With reference to FIG. 8, the server 821 may include a logon user interface application. For example, the application may be LogonUI for a WINDOWS operating system. The server 821, via the application, may determine whether the client device 801 comprises or is connected to one or more smart card readers. The application may discover the smart card reader(s) via a PC/SC request, such as via the PC/SC hook 839 of the server 821. The discovery request may bypass the cryptographic API 829 of the server 821. The PC/SC hook 839 may communicate the request with PC/SC 815 of the client 801 via the virtual channel driver 835 and/or the virtual channel driver 805, and the request may be sent at the PC/SC level. The PC/SC 815 on the client side may return, via the PC/SC layer, an indication that the client device 801 has one or more smart card readers.

The server 821, via the application, such as LogonUI for WINDOWS, may send a request to the smart card reader(s) for the status of the readers(s) to see, for example, if a smart card is present (e.g., whether a card has been inserted or not). The status request may be transmitted at the PC/SC level, such as via direct calls to the PC/SC hooks 839. The status request may bypass the cryptographic API 829. The PC/SC hook 839 may communicate the request with PC/SC 815 via the virtual channel driver 835 and/or the virtual channel driver 805, and the request may be sent at the PC/SC level. The PC/SC 815 on the client side may return, via the PC/SC layer, an indication of whether a smart card has been inserted in the reader.

If a smart card is identified (e.g., smart card 817), the client device 801, via PC/SC 815, may retrieve information associated with the smart card 817, such as a unique identifier for the smart card 817 or the type of smart card (e.g., as an ATR file). The ATR (or other identifier) of the smart card may be retrieved from the smart card 817 via, for example, a SCardGetStatusChange PC/SC function. The client device 801 may transmit a response to the server 821 via the virtual channel driver 805 and/or the virtual channel driver 835. The response may be transmitted at the PC/SC level. The response may include the ATR (or other identifier) of the smart card.

The server 821 may receive the response comprising the smart card's unique identifier (e.g., ATR) via the virtual channel driver 835. As previously explained, the server 821 may know whether fast smart card redirection is enabled or not via, for example, protocol negotiation. If fast smart card is enabled, then the PC/SC redirection layer of the server 821 (e.g., a smart card service) may substitute the ATR of the smart card 817 with the ATR of a proxy smart card. The substitution of the real smart card ATR with the proxy smart card ATR may be performed on the fly by the PC/SC redirection layer in the direction of client to server and/or server to client. The information associated with the smart card 817, including the substituted ATR may be sent to the PC/SC hooks 839. The logon user interface of the server 821 may retrieve the information, including the substituted ATR, via PC/SC hooks 839.

Based on the substituted ATR, the logon user interface of the server 821 may determine which CSP to use for cryptographic operations. For example, the logon user interface may query a resource database to determine whether any entries in the database include the ATR or a portion thereof and/or whether any entries associate the ATR with a particular CSP. An example database is illustrated in FIGS. 16A-B.

With reference to FIG. 16A, assume, for example, that the substituted ATR comprises a hexadecimal value of 3b if d9 43 69 74 72 69 78 53 6d 61 72 74 43 61 72 64 96. The server 821, via the logon user interface, may search the database for a corresponding (e.g., matching) ATR (e.g., having a hexadecimal value of 3b if d9 43 69 74 72 69 78 53 6d 61 72 74 43 61 72 64 96). The server 821 may find the ATR 1615 and determine that it corresponds to the substituted ATR.

After the server 821 identifies the ATR 1615, the server 821 may attempt to retrieve the name of the smart card corresponding to the ATR. For example, a SCardListCards PC/SC function may be called to retrieve the smart card name. In this example, the smart card name that is retrieved may be remote smart card 1610.

After the server 821 retrieves the smart card name (e.g., remote smart card 1610), the server 821 may determine the CSP associated with the smart card, such as by querying the database (e.g., a registry). For example, a SCardGetCardTypeProviderName PC/SC function may be called to determine the CSP. In this example, the CSP name that is retrieved may be smart card crypto provider 1620, and smart card crypto provider 1620 may identify, for example, the CSP 831 shown in FIGS. 8 and 9. Accordingly, the server 821, via the logon user interface application, may discover the association between the CSP 1620 and the ATR 1615. The server 821 may load the CSP and use the CSP for cryptographic operations involving the smart card at the client (e.g., smart card 817). Various examples of using a fast smart card CSP, such as CSP 831, were previously described. Moreover, the cryptographic API 829 may be used to access the CSP 831. A CryptAcquireContext function specifying the CSP name may be used to perform cryptographic operations working with the fast smart card mechanism.

As previously explained, one or more operations involving the smart card 817 may be redirected to the client device 801 via the virtual channel 836 at a higher layer than the PC/SC layer. In some aspects, the system may attempt to redirect as many operations as possible to the higher layer, rather than the PC/SC layer. As previously explained, exemplary cryptographic operations that may be remoted to the client device 801 (e.g., via a remote session protocol) include, but are not limited to, a request to list the certificates on the smart card 817, a request for a certificate, sign operations using the private key of the smart card 817, and decrypt operations using the private key of the smart card 817. Use of fast smart card logon may provide faster performance if, for example, high latency is present.

The CSP 831 may be used for fast smart card logon cryptographic operations, and the CSP 831 may communicate with the client device 801 via the virtual channel driver 835 (and/or the corresponding virtual channel driver 805 at the client device 801). The cryptographic API 809 of the client device may communicate with CSP 811 to complete cryptographic operations using the smart card 817.

Communicating at a higher layer than the PC/SC layer may result in several technical benefits. For example, PC/SC may be a chatty protocol, and retrieving the certificate(s) from a smart card may translate to hundreds of synchronous PC/SC requests/replies (e.g., via a SCardTransmit PC/SC function). If network latency is high (e.g., 150 ms or more), using the remote smart card may be too slow for the end-user and result in a poor performance. For example, cryptographic operations may take a long time to execute because of the latency of potentially hundreds of requests/replies added up for one operation. By redirecting smart card operations to a higher layer, the speed of authentication or other operations using a smart card may be improved.

Figure 17:
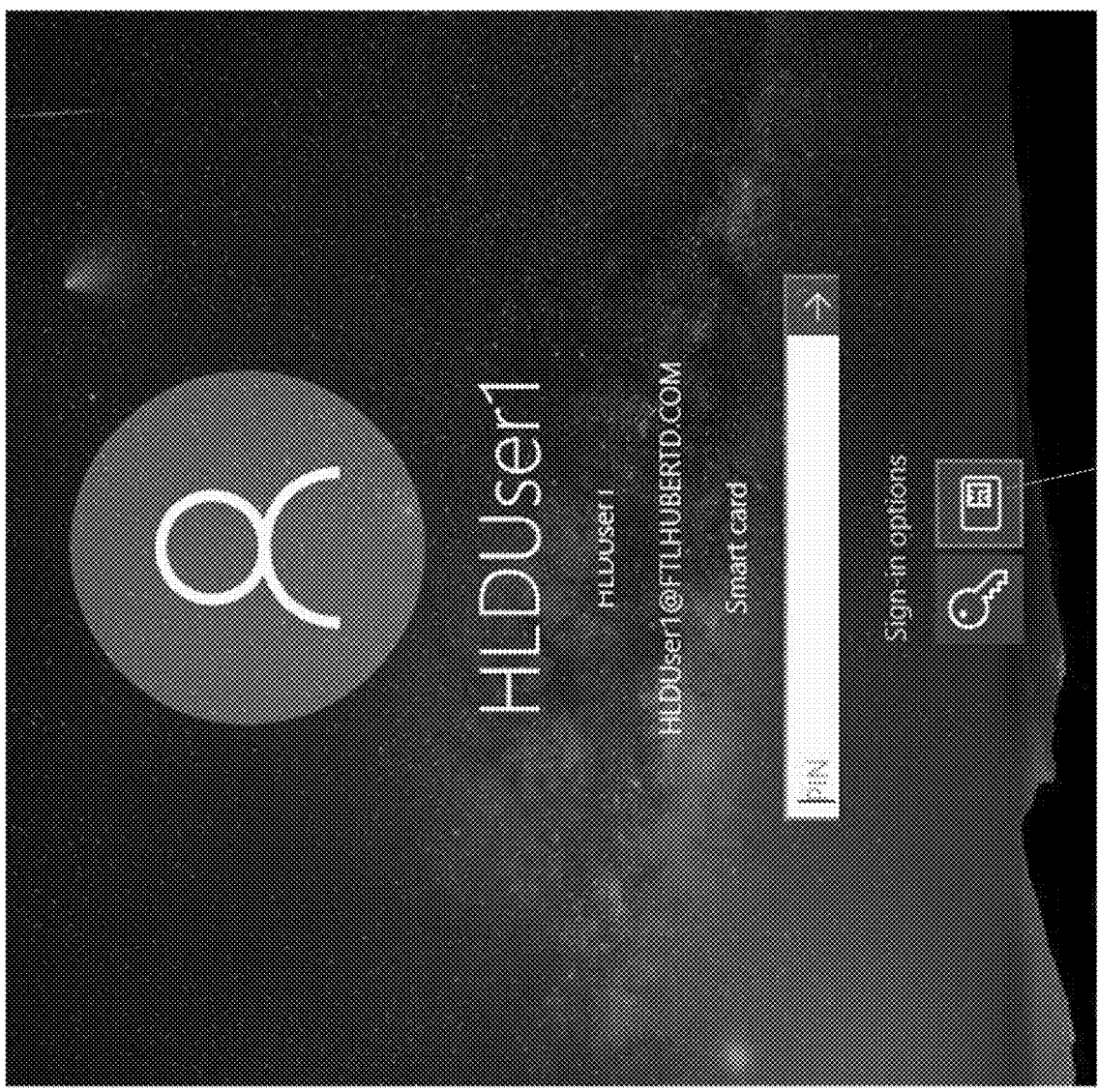
FIG. 17 depicts an illustrative user interface in accordance with one or more illustrative aspects described herein.

During the cryptographic operations, a user interface for receiving credentials may be displayed on a display associated with the client device 801. FIG. 17 depicts an illustrative user interface 1700 in accordance with one or more illustrative aspects described herein. The user interface 1700 may display, for example, a username and/or sign-in options, such as using a password or using a smart card. The user may select an option 1710 to authenticate using a smart card and may input credentials associated with the smart card, such as a PIN. Once the user provides the PIN or other credentials, the credentials may be encrypted and used to authenticate the user. As previously explained, the PIN (or other credentials) may be stored, and the stored PIN (or other credentials) may be used to unlock the smart card 817 for application use after logon. The client device 801 may be authenticated to a domain controller using the smart card 817.

With reference to FIG. 8, the PIN (or other credentials) may be retrieved from a UI and provided to a CSP (e.g., CSP 831 and/or CSP 833 illustrated in FIG. 8) on the server-side (e.g., via a LogonUI application). As previously explained, the PIN may be sent to the agent on the client-side, and the PIN may be carried over the virtual channel 836. A public/private key pair or any other asymmetric cipher may be used to protect the PIN. The client agent 803 may generate on the fly the public/private key pair, such as upon startup. The key pair may be stored in memory and may be performed if fast smart card is enabled. After the smart card virtual channel has finished its negotiation (e.g., if fast smart card is enabled), the generated public key may be sent to the server-side. The CSP 831 may then retrieve the received public key. When sending the smart card PIN (or other credentials) to the client-side, the CSP 831 may encrypt the PIN with the public key. The PIN may be sent encrypted over the virtual channel 836 and/or back to the virtual channel driver 805. The virtual channel driver 805 and/or client agent 803 may decrypt the PIN with the private key stored in memory. The virtual channel driver 805 and/or client agent 803, via the CSP 811, may then execute one or more cryptographic operations which use the PIN. This may allow protection of the PIN from the CSP 831 to the virtual channel driver 805 and/or client agent 803, which may execute one or more cryptographic operations with the CSP 811 that uses the PIN (or other smart card credentials).

Illustrative Embodiments of Federated Logon

The components used to implement fast smart card logon previously described may also be used to implement a federated full domain (e.g., Active Directory (AD)) logon. After a full domain logon, the session may have full network credentials (e.g., Kerberos ticket granting ticket (TGT) and challenge/response password hash (e.g., NTLM password hash)). For example, users may authenticate to a virtual desktop session, physical PC, or a remote desktop server session as an Active Directory user account by providing a SAML authorization token. As will be discussed in further detail in the examples that follow, a user may authenticate to an external component/service/device, such as an Identity Provider (IdP), using any type of credential and/or authentication protocol that is appropriate. This authentication may be called an external authentication event. Example external authentication events include logon at a Security Assertion Markup Language (SAML) Identity Provider, smart card authentication over TLS or SSL, and alternative authentication credentials such as biometrics or one-time password (OTP) without an AD password.

After the authentication with the IdP, the IdP may issue a confirmation token (e.g., a SAML token) to a named Relying Party (RP) or Service Provider, which may be used to process a service access request from the user. The RP may use a fresh SAML token from the IdP in order to be satisfied of the requesting user's identity, without needing to know all the authentication details or interact with the credentials directly. Instead of a SAML token, other token formats or identity confirmation mechanisms may be used, as long as the credential mapping service (discussed below) may be assured that the IdP has confirmed the user's identity. A virtual smart card credential (also referred to as a short duration logon certificate), may be issued based on the acceptance of the external authentication event (e.g., authentication by the IdP).

The certificate operation interception components from fast smart card logon described above may be used to enable interaction with the virtual smart card without fully emulating a smart card at the PC/SC API level. The virtual smart card may be created at the IdP, locally at the remote computing environment (e.g., the authentication server), and/or on a separate server that may be highly protected, such as a server hosting the credential mapping service.

Various federation scenarios exist. For example, traditional federation of external users may be business to business (e.g., partners in supply chain, joint collaboration, etc.). Consumer to business may include e.g., citizens, retirees, veterans, etc. Cloud services may include enterprise controlled user authentication to access software as a service (SaaS) products and/or data as a service (DaaS) where cloud desktop is used to access enterprise resources. A next generation enterprise security model may include an identity provider (IdP) as a central point for user authentication, for SaaS and on-prem resources, from devices. IdP itself may be on-prem or a cloud service, such as identity as a service (IDaaS).

Figure 11:
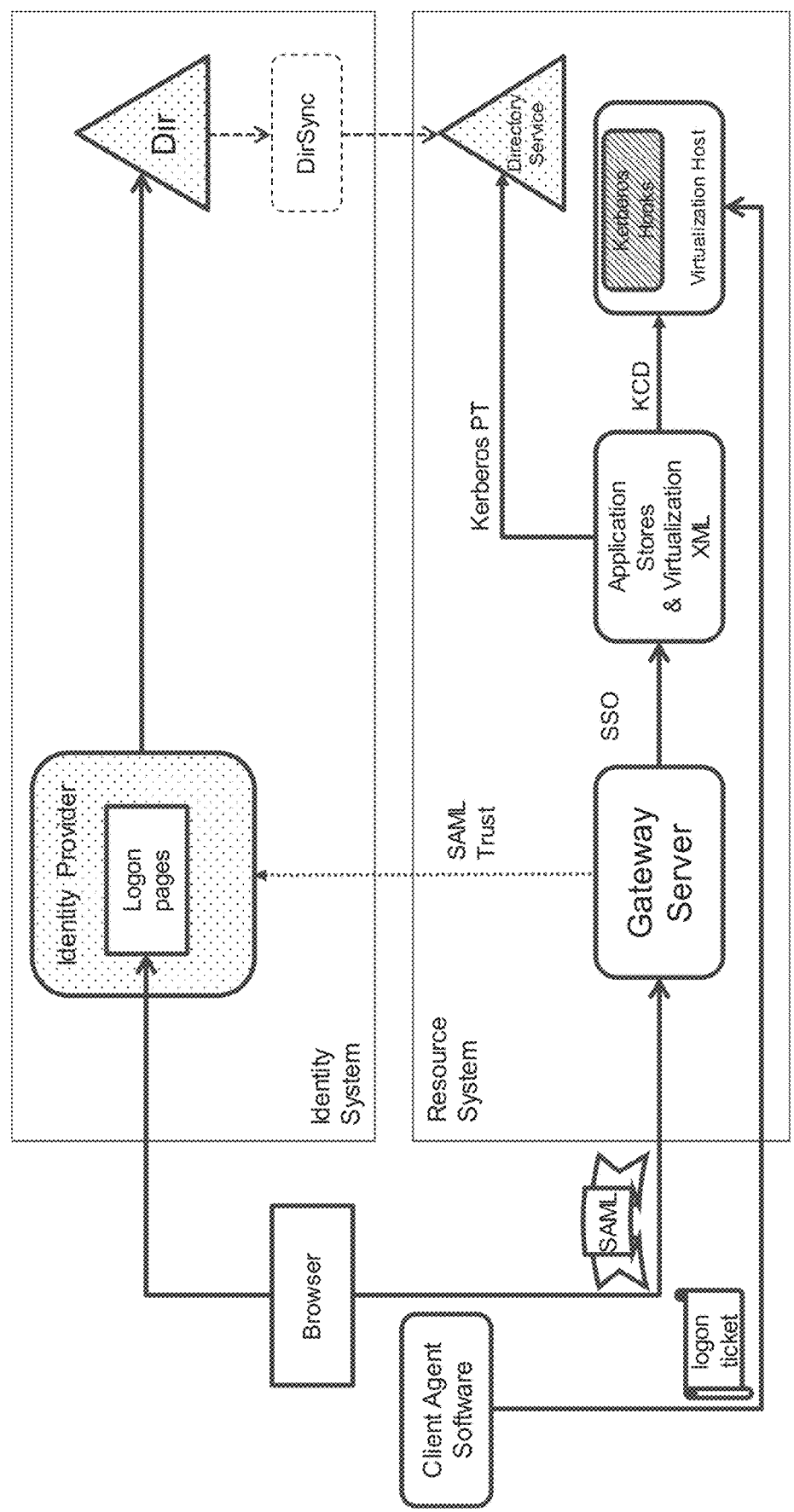
FIG. 11 depicts an illustrative system for federated logon in accordance with one or more illustrative aspects described herein.

FIG. 11 depicts an illustrative system for federated logon in accordance with one or more illustrative aspects described herein. The system illustrated in FIG. 11 might not use a credential mapper, as is used in the exemplary systems illustrated in FIGS. 12A-C.

Figure 12A:
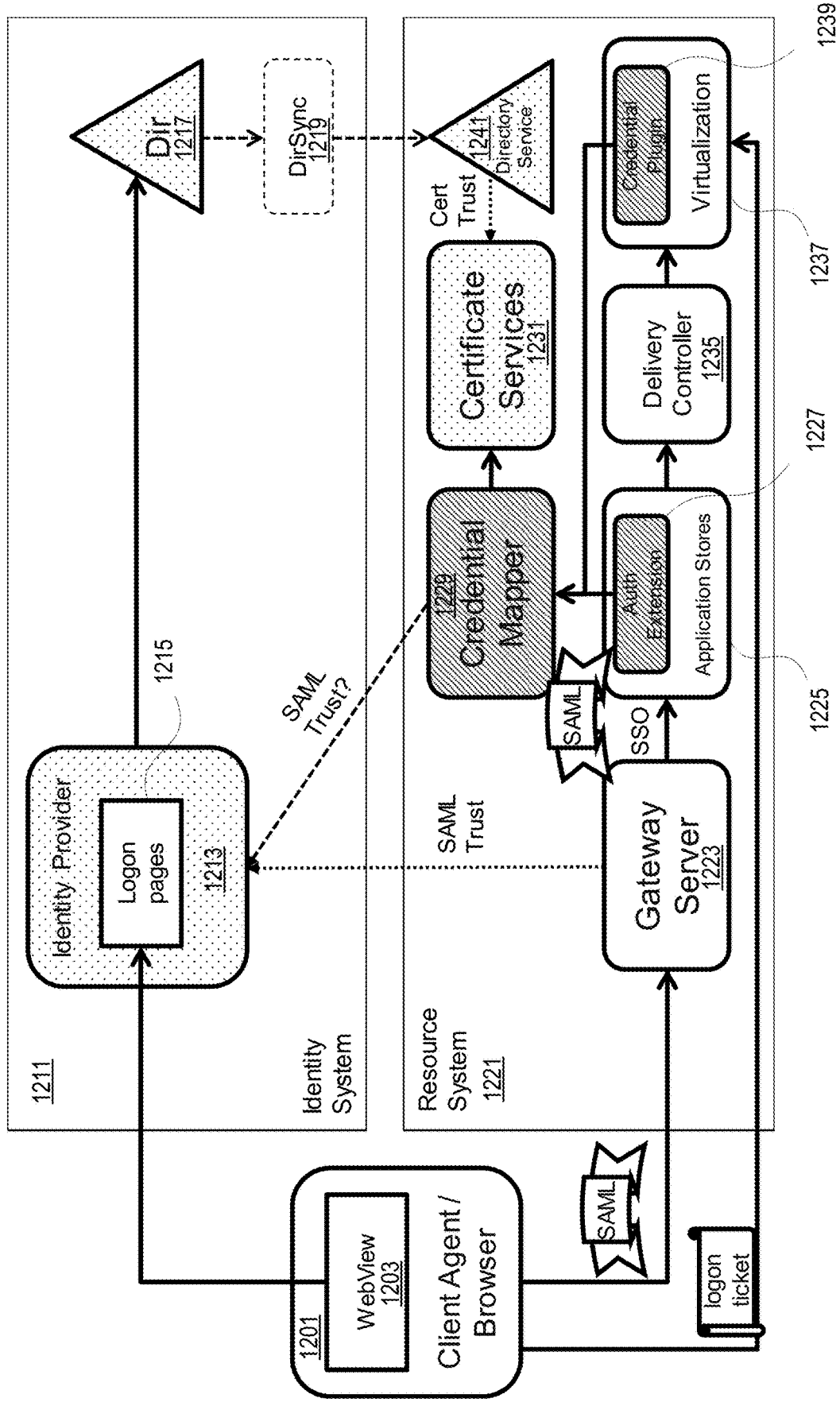
FIG. 12A depicts another illustrative system for federated logon in accordance with one or more illustrative aspects described herein.

FIG. 12A depicts another illustrative system for federated logon in accordance with one or more illustrative aspects described herein. In some aspects, a smart card might not be used in this federated logon case. Instead, a certificate may be used for authentication, and a resource system 1221 (e.g., a customer premises) may think that the certificate is a smart card certificate. The system 1221 may initiate a setup phase. The application store 1225 may comprise a trusted device and be used to request, from a credential mapper 1229, domain (e.g., AD or directory service 1241) logon credentials for a user. The credentials may comprise a short-lived smart card class certificate (e.g., a virtual smart card certificate). The credential mapper 1229 may be trusted by certificate services 1231, such as a third party certificate service (e.g., MICROSOFT certificate services), to request short-lived smart card class certificates for AD users. The credential mapper 1229 may be used to create a virtual smart card for the user. The credential mapper 1229 may request the certificate from the certificate services 1231, and the certificate services 1231 may return, to the credential mapper 1229, a smart card class certificate for the user. The virtual smartcards may be stored (e.g., cached) at the credential mapper 1229.

A custom template may be used to provide control. As well as providing control over the issuance infrastructure (e.g., restricting or identifying the servers that are trusted to request smart card class certificates), a custom template can also cause special markers to be included in the issued certificates which result in a special group membership being inserted into logon tokens and Kerberos tickets. In some aspects, multiple markers may be placed in a certificate, each of which selects its own group membership. This may provide flexibility to map different attributes making up the full circumstances of the authentication and the service provider access request into distinct groups, making it easier to express the desired resource access control policies. These markers may allow, for example, WINDOWS-based infrastructure and services to recognize that users have authenticated to AD by this particular mechanism, rather than using a real smart card or password.

Different templates may be used by the credential mapping service 1229 based on attributes of SAML tokens, or other indications of the true level of authentication assurance. Additional or alternative authentication circumstances may be of interest besides the authentication assurance level. For example, the geographic location of the user or the connection route used for accessing the service provider (e.g., inside versus outside a boundary) may be of interest. The certificate template may be selected based on a mapping from some or all of these available attributes and circumstantial indicators. Additionally or alternatively, custom statements or attributes may be added to the certificates by the credential mapping service 1229, e.g., via the certificate signing request sent by the credential mapper service 1229 to the Certificate Authority. These might not be mapped to security groups, but can be inspected by applications such as web applications that directly use client certificate authentication.

The directory service 1241 may trust certificate services 1231 to issue smart card class certificates for user logon. This trust step may enable the virtual smartcard certificates to be used for, for example, Active Directory logon. A trust fabric may be in place to establish service-to-service identity and secure communications. Optionally, the credential mapper 1229 may cross-check SAML tokens issued by an identity provider (IdP) 1213.

The system may initiate a runtime phase. Webview 1203 in the client agent 1201 may be used to handle IdP logon. The client agent 1201 may send credentials to the IdP 1213 for logon. Webview 1203 may also support standard security assertion markup language (SAML) protocol for SAML logon to the gateway server 1223 or application stores 1225. The gateway server 1223 may be a server or other resource that provides access to enterprise resources and/or cloud resources. During the logon process, the IdP 1213 may send an identity confirmation token (e.g., a SAML token) back to the client agent 1201. The SAML token may be used by the client agent 1201 as proof that it has authenticated with the identity system 1211, which may comprise an external partner of the resource system 1221.

The logon pages 1215, which may comprise HTML pages containing web forms, may be used to collect authentication credentials from the user or potentially from the browser or client agent itself. These credentials can range from username and password forms to sophisticated risk-based authentication systems. The IdP 1213 may use these logon pages 1215 to authenticate legitimate users with any appropriate authentication method or methods.

The directory 1217 may comprise an identity store or account database or other directory that supports the IdP 1215. For example, the directory 1217 may be an instance of Active Directory in another company's network, or use another vendor's LDAP directory product.

DirSync 1219 may comprise a mechanism or set of mechanisms to ensure that there are shadow accounts in directory service 1241 for each legitimate and authorized user in the directory 1217 who should be permitted access to the applications and desktops hosted in the resource system 1221 (which may be exposed via the virtualization server 1237). Examples of a DirSync 1219 mechanism include manual procedures such as emailing or uploading a spreadsheet with a list of authorized user names and other relevant identity or authorization information. Other examples include periodically scheduled or permanently repeating batch jobs that query the directory 1217 for some or all accounts (perhaps in a distinguished portion of the directory) and transmitting them to the directory server 1241. Other examples include monitoring the directory 1217 for changes and transmitting those changes, either as they occur or according to a schedule. Another mechanism is implicit—the existence of a new authorized user in directory 1217 may be implied when a federation token quoting that user identity is presented to the resource system 1221.

In some aspects, proof key binding may be used. A SAML token proof key may be linked to the virtual smart card that is created to allow full domain logon. This proof key (or a related proof key) may then be used by the remote computing environment to actually use the virtual smart card. The client agent 1201 may negotiate the proof key that is bound to the SAML token issued by the IdP 1213.

In some aspects, the SAML token or other trusted logon credential may be mapped to the corresponding AD user password, even if the password is not directly available during the gateway server 1223 or application store 1225 logon process (which will be described in further detail below). For example, the password may be captured by the IdP 1213 during its logon and relayed over a trusted back channel to the gateway server 1223 or the application store 1225. In other aspects, a password vault or password control service may return the password to the gateway server 1223 or the application store 1225. In another example, the credential mapper 1229 may itself control the password for certain user accounts. These passwords might not be user-selected passwords, and accordingly, they could be derived from a master key using per-user salts. In this example, a database or password vault might not be used.

The client agent 1201 may send the SAML token to the gateway server 1223 and/or the application store 1225 when a full domain logon is to be requested. The gateway server 1223 and/or application store 1225 may communicate with the IdP 1213, such as by sending the SAML token (e.g., via a back channel), to verify that the client 1201 is authenticated with the identity system 1211. If the SAML token includes a time, such as a time period of validity, the IdP 1213 may verify that the current time is within the time period of validity. Additionally or alternatively, relying parties (components) may locally validate the SAML token by checking the digital signature it contains using a locally stored (e.g., trusted) copy of the IdP's signing certificate.

The application store 1225, delivery controller 1235, and/or virtualization device 1237 may securely carry custom logon data provided by the application store 1225 to a credential plugin 1239 that may be used to drive a logon process on the virtualization device 1237. The application store may comprise an authentication extension 1227, such as a logon data provider, which may be used to obtain a virtual smart card reference, a matching credential plugin for the virtualization device 1237 to access the virtual smart card, and supporting service infrastructure (e.g., the credential mapper 1229) to implement the virtual smart cards, as described herein.

Once it is verified that the client 1201 is authenticated, the gateway 1223, application store 1225, and/or delivery controller 1235 (e.g., a Desktop Delivery Controller) may authorize the credential mapper 1229 to obtain a time-limited (e.g., temporary) smart card class certificate for AD logon on a designated virtualization machine. In other words, a temporary certificate may be created to emulate a smart card (e.g., one or more certificates in a smart card). Time-limited certificates may be valid for minutes, hours, days, or even shorter or longer. To support the authorization step, the store 1225/controller 1235 may present the original SAML token from the IdP 1213, for its validity to be verified again by the credential mapping service 1229. For example, the credential mapper 1229 may communicate with the IdP 1213 to verify the SAML token. This step can also facilitate transfer of proof key binding from the SAML token to the virtual smart card, or negotiation of a new proof key.

A logon ticket may be issued and go in a remote display protocol (e.g., client agent) file. With the logon ticket approach, the logon ticket sent to the client agent 1201 may also be used to first encrypt the virtual smart card private key held by the credential mapping service 1229. Additionally or alternatively, a proof key held by the client agent 1201 may be linked (e.g., bound) to the short-lived certificate. Optionally, the credential mapper 1229 may be presented with the original IdP authentication token as evidence of a valid logon by the client 1201. The logon ticket may additionally or alternatively be used to encrypt a secure reference to the virtual smart card provided by the credential mapper 1229. In this example, the virtual smart card might only be recovered by the virtualization agent 1237 that is authorized by the delivery controller 1235 to use the virtual smart card. The encrypted virtual smart card reference may be sent from the application store 1225 to the delivery controller 1235 and then to the virtualization agent 1237, while the logon ticket is sent to the client agent 1201. This may allow the virtual smart card to be created before the virtualization agent 1237 is known, or to be used to logon separately to multiple virtualization agents.

The virtualization agent 1237 may present the logon ticket (or the secure virtual smart card reference decrypted using the logon ticket) to the credential mapping service 1229, and use the smart card class certificate to log the client device 1201 on to a directory service 1241, such as MICROSOFT AD. The credential plugin 1239 (e.g., a logon hook) may be very similar or identical to the fast smart card logon approach previously discussed. The credential plugin 1239 may comprise the server-side virtual agent 823, credential provider 825, and/or the CSP 831 described with reference to FIG. 8.

The credential mapper 1229 may interact with the certificate service 1231, which may comprise a certificate authority such as WINDOWS certificate services, to obtain smart card class user authentication certificates with corresponding private keys. That is, the credential mapper 1229 may be used as a registration authority (e.g., MICROSOFT Enrollment Agent) for users. The credential mapper 1229 may have a registration authority certificate to use as an authentication credential when sending requests to certificate services 1231. There may be a bootstrap process to obtain the credential the first time, after which renewal may happen automatically as needed to minimize manual steps.

The smart card class certificates may be trusted by the directory service 1241 (e.g., an AD domain) as interactive logon credentials for the relevant user accounts. In other words, the certificates may be treated as virtual smart cards, e.g., a smart card class user certificate. The certificates may have appropriate key usage for AD logon through, for example, Kerberos with a corresponding private key held in a key store on the credential mapper server 1229. Hardware-based key protection may be used on the private key, such as via a trusted platform (e.g., WINDOWS Trusted Platform Module (TPM)) and/or a hardware security module (HSM). Hardware-based key protection may also be used to beneficially reduce logon latency.

The authentication extension 1227 of the application store 1225 may interact with the credential mapper 1229 during the application store 1225 launch sequence (and optionally during the application store 1225 logon sequence) in order to prepare a virtual smart card for the user. The virtual smart card for a user may be created on demand, e.g., for each launch or reconnect event, or may be reused for a period of time depending on various security policies and performance needs. Virtual smart cards may be pre-created and have lifetimes closer to that used for physical smart cards, particularly if there is hardware protection for the private keys, as described above.

The credential plugin 1239 of the virtualization server 1237 may intercept the relevant operating system calls to use the virtual smart card during logon, in order to redirect certain operations to the credential mapper server 1229 where they will be performed using the cryptographic APIs and providers.

Figure 12B:
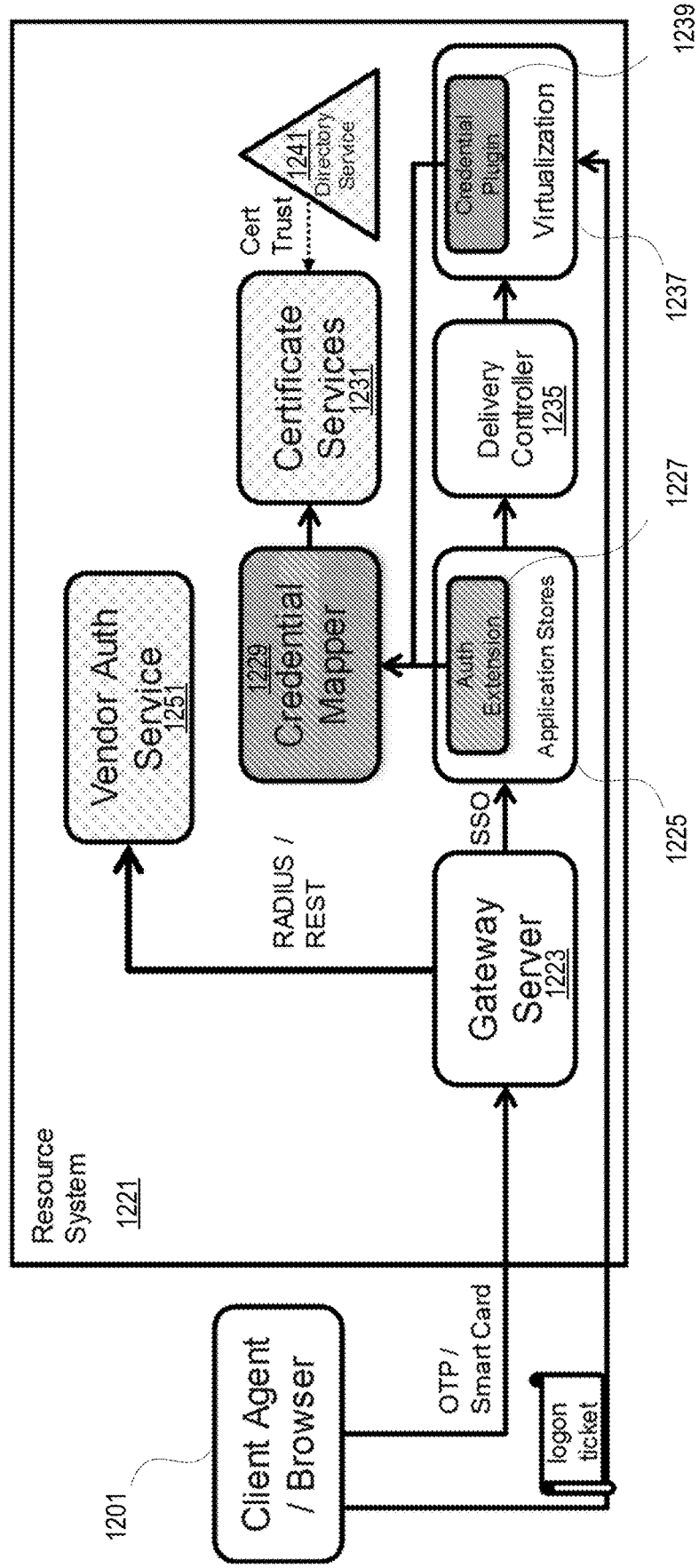
FIG. 12B depicts yet another illustrative system for federated logon in accordance with one or more illustrative aspects described herein.

FIG. 12B depicts yet another illustrative system for federated logon in accordance with one or more illustrative aspects described herein. The authentication system illustrated in FIG. 12B may be similar to the authentication system described with reference to FIG. 12A. However, instead of using an identity confirmation (e.g., SAML token), the client agent 1201 may send a one time password (OTP) or actual smart card credentials to one or more of the components in the resource system 1221, such as the gateway server 1223. The gateway server 1223 may authenticate the client or user with a vendor authentication service 1251, as will be described in further detail below. Moreover, the gateway server 1223 may communicate with the authentication service 1251 using a RADIUS or REST protocol, as will also be described below.

Figure 12C:
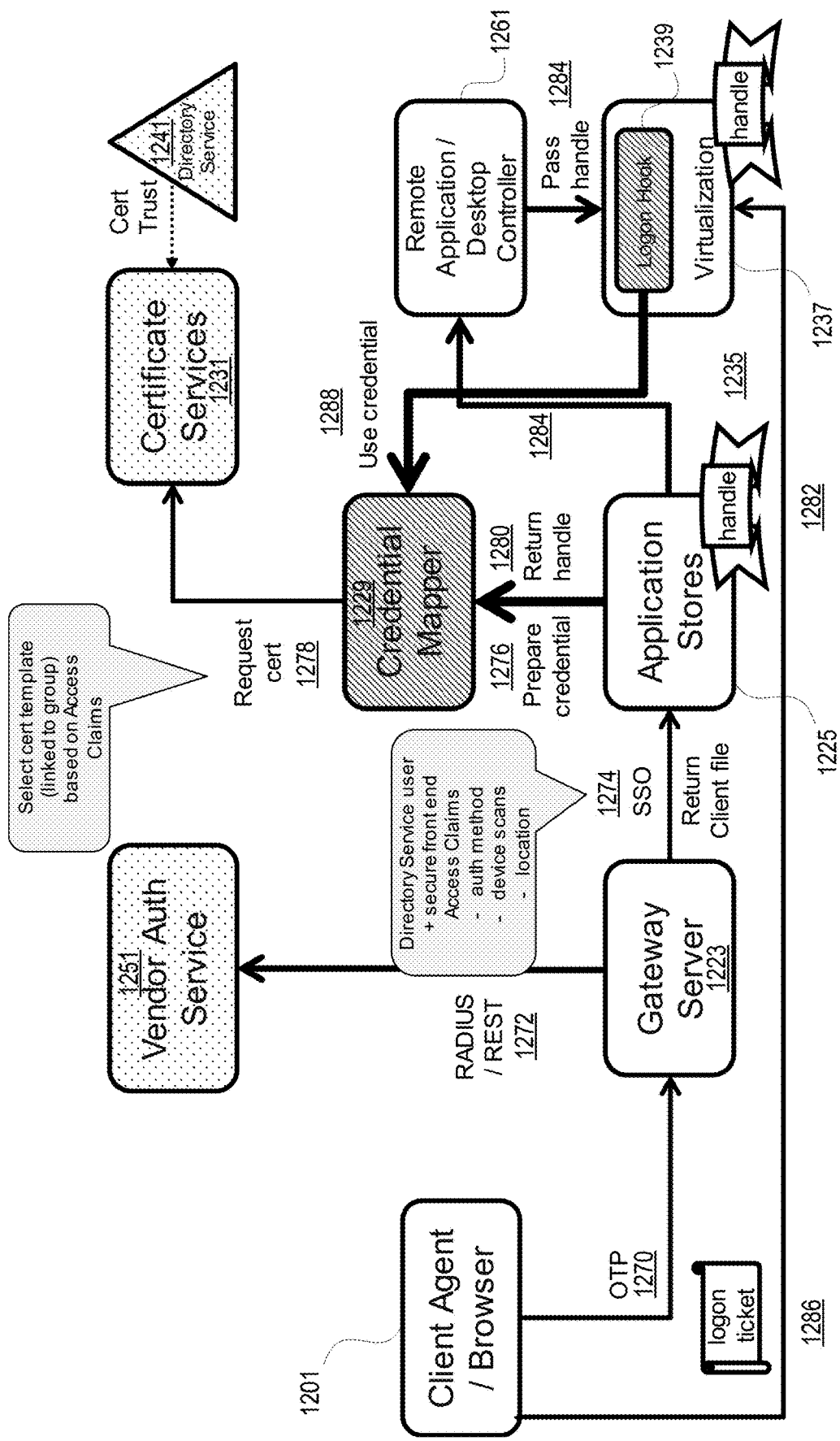
FIG. 12C depicts another illustrative system for federated logon in accordance with one or more illustrative aspects described herein.

FIG. 12C depicts another illustrative system for federated login in accordance with one or more illustrative aspects described herein. The components described with respect to FIG. 12C may be used to create and use a virtual smart card to start a user session (e.g., a virtual desktop session). The AD domains that hold user accounts may have a pre-established trust of the correct form to allow smart card class user certificates issued by a certificate authority (CA) such as certificate services 1231, to be used for full AD domain logon. Initially, several deployment steps may be performed (not illustrated). For example, the system may perform steps (which may be manual steps) to deploy the credential mapper 1229 and to establish trust among the components illustrated in FIG. 12C.

A credential mapper 1229 may comprise a registration authority (e.g., an enrollment agent) to the CA. The credential mapper 1229 may request its own credential, such as a client certificate issued by the CA using a bootstrap certificate template that may use manual approval by an organization's CA administrator (e.g., a security officer). Once the first certificate has been issued, a second certificate template may allow an RA certificate rollover to be handled automatically. A rollover may comprise issuance of a new certificate as the expiration of the current certificate draws near.

The second certificate template may also allow one instance of the credential mapper 1229 to authorize another server to join the group and host another instance of the credential mapper 1229. This may be used for scale out and redundancy, while minimizing the operational burden of setup and ongoing maintenance. This may be beneficial if users of this feature are not experts in operating and maintaining such certificate-based deployments while maintaining high availability.

An example flow will now be described with reference to FIG. 12C. The client agent 1201 (or a browser) may logon to the gateway server 1223. In some aspects, a one-time password (OTP) may be used instead of an AD password. The user may be issued an OTP. Other authentication credentials, such as a SAML token, smart card credentials, challenge/response credentials, Kerberos credentials, biometrics, PINs, and the like, may alternatively be used instead of the OTP. In step 1270, the client agent 1201 (or a browser on the client device) may send the OTP to the gateway server 1223. Because an AD password is not used, the gateway server 1223 might not be able to use the password to sign on (e.g., in a single sign on) to the application store 1225. Instead, in step 1272, the gateway server 1223 may authenticate the user via a vendor authentication service 1251. For example, the gateway server 1223 may use the Remote Authentication Dial-In User Service (RADIUS) network protocol, Lightweight Directory Access Protocol (LDAP), Representational State Transfer (REST) network protocol, or any other type of network protocol to authenticate the user based on the OTP. The gateway server 1223 may send, for example, cleartext user credentials encrypted as part of a transport protocol such as RADIUS, LDAP, or REST. The authentication service 1251 may recover the cleartext credentials and validate them. The authentication service 1251 may report back whether the credentials are valid, and potentially supply extra identity information such as a canonical username and group IDs.

In step 1274, the gateway server 1223 may send the identity of the user (e.g., AD identity) to the application store 1225, via a single sign on protocol. The gateway server 1223 may also send security context information to the application store 1225. Exemplary information sent in step 1274 includes the authentication method, information identifying the scans performed on the client device, and/or the location of the client device. Several steps may be performed during the SSO session initiated by the gateway server 1223.

In step 1276, the application store 1225 may contact the credential mapper 1229 (e.g., a user credential service) to ensure that a matching user certificate and private key is available to enable Windows AD logons. Some or all of the security context information passed by the gateway server 1223 to the application store 1225 may be sent to the credential mapper 1229 for incorporation into the user certificates. The context information may be sent in condensed, expanded, or mapped form. The application store 1225 may control what security context information is passed to the credential mapper 1229. Another piece of information that may be passed may comprise a role label associated with a security group (e.g., a WINDOWS security group). The role label may be chosen based on the raw security context information, and may be a customer security policy decision. Users may be added to security groups.

The application store 1225 may also authenticate to the credential mapper 1229, such as by using Kerberos or a device certificate. If it uses a machine level authentication, the credential mapper 1229 may implement a whitelist of machines trusted to request credential handles which can be used later (e.g., by a different set of trusted machines) for logon (e.g., user impersonation). Alternatively, the application store 1225 may use Kerberos Constrained Delegation (KCD) and Protocol Transition to impersonate the user immediately and perform Kerberos user authentication to the credential mapper 1229. This may allow the whitelist to be managed using standard AD controls for KCD. This may also provide a mechanism to blacklist particular sensitive user accounts, such as administrators, who can be excluded from user impersonation.

In step 1278, the credential mapper 1229 may act as a registration authority (e.g., an enrollment agent) to the certificate services 1231 (CA) based on pre-established authorizations that allow the credential mapper 1229 to request certificates for certain users. Using the role label provided by the application store 1225, the credential mapper 1229 may determine which CA and certificate template combination to use to obtain a certificate for a particular session. Customers can use the Authentication Mechanism Assurance feature of AD and Enterprise Certificate Services (e.g., WINDOWS SERVER 2008) to cause user sessions based on these certificates to belong to particular security groups, such as WINDOWS security groups. This may allow the virtualization session 1237 to be granted or denied access to network resources using standard WINDOWS access control lists (ACLs). The ACLs may list access control entries (ACE) used to identify a trustee and to specify the access rights for the trustee.

The credential mapper 1229 may use its RA certificate provisioned during deployment to prove its service identity to the certificate services 1231. This may be used by the certificate services 1213 to authorize or deny access to the requested certificate template and thus to allow or deny the certificate issuance request 1278. The WINDOWS Enterprise Certificate Services may allow ACLs on certificate template and enrollment agents that allow restricting which entities can issue certificates and for which subjects.

In step 1280, once the credential mapper 1229 has created or located an appropriate user certificate for the session, the credential mapper 1229 may return a secure handle to the application store 1225 that can be used by virtualization machines to later access the certificate credential. The returned handle may be similar to an OAuth token. For example, the handle may comprise a secure random number combined with other information, such as a server identity tag, to later allow network access from another machine. The handle might not be usable purely as a bearer possession token. Rather, the token may be used when presented by a machine that can independently prove its identity (using Kerberos or a machine certificate, for example) and is on a whitelist of authorized machines.

In step 1282, the application store 1225 may cache the credential handle, similar to how the application store 1225 might cache a user password. Depending on its size and other considerations, the handle may be placed verbatim into the SAML auth tokens issued by the application store 1225 authentication service to be cached by the client agent 1201 or other components. Alternatively, the handle may be placed into a credential holder or vault maintained on the application store servers 1225 for access when processing later requests the handle. The application store 1225 logon process may complete at this stage.

In step 1284, a resource launch request may be made after logon by the gateway server 1223 and/or the application store 1225. The credential handle may be recovered from the application store 1225 SAML auth token, either directly or indirectly. As part of the launch processing, the handle may be transported via the desktop controller component 1261 to the machine that will host the user's session (e.g., virtualization session 1237, such as a WINDOWS session), in preparation for a display remoting connection that may be later made. For example, the handle may be passed to the virtualization session 1237 using the remote application or desktop controller 1261. The session may comprise a virtual desktop or a virtual application session, and the host 1237 may be dedicated to one user session at a time or allow multiple independent user sessions (e.g., using remote desktop services). The user session may already exist if this is a reconnection event, or may be about to be created if this is a first time launch event. The session host 1239 may receive the handle and may cache the handle temporarily while awaiting the display remoting connection. The handle may also be encrypted prior to the transmission and caching steps to minimize the risk of disclosing the handle. The key for decrypting the handle may be sent to the client agent 1201 as part of the normal client agent launch file, in the form of a logon ticket.

In step 1286, the client agent's engine may be started using the client agent launch file received from application store 1225. The client agent 1201 may present the logon ticket to the session host 1237 as part of the client agent session negotiation. Although not illustrated, the client agent connection may be proxied via the gateway server 1223, involving a separate authorization ticket.

In step 1288, using the logon ticket to derive the decryption key, the credential handle may be recovered and used to request credential operations be performed by the credential mapper 1229. The operations that are requested may be used to remotely perform a smart card logon, such as operations to get the user certificate itself, to perform one or more sign operations, and/or to perform one or more decrypt operations to unwrap Kerberos session keys. An alternative form of interaction may be to create the ephemeral virtual smart card directly on the virtualization agent 1237 (e.g., just in time). In this example, the CSP may create a key pair and then send a certificate signing request for the public key to the credential mapper 1229, in place of the normal get certificate request. This request may be made using the credential handle and using machine authentication.

The credential mapper 1229 may request a certificate for the user based on role and other security context information, as previously discussed. The certificate may be returned to the virtualization agent 1237, but the remaining virtual smart card operations may be performed locally as the key is present locally.

The credential mapper 1229 may be modified to not create a key pair. Instead, the credential mapper 1229 may remember the relevant information for obtaining the user certificate (e.g., the user identity, role, or other security context information). The credential handle may be a reference to this information rather than a virtual smart card already prepared using that information.

Similar to the fast smart card login case, the CSP may delegate many or most of the operations to another CSP (e.g., a standard CSP) on the virtualization agent 1237. In the full federated logon case, the standard CSP may comprise a CSP that can leverage a TPM or other HSM to provide strong key protection or acceleration features. The key may be kept available for use during the session. The key may also be held in memory long enough to use for logon and then be destroyed. In the foregoing example, cryptographic operations may be distributed across the virtualization agents 1237, reducing the load on the credential mapper 1229.

The session host machine (e.g., virtualization session 1237) may authenticate to the credential mapper 1229 using, for example, Kerberos or a device certificate. The credential mapper 1229 may implement a whitelist of machines that are trusted to use credential handles in this way to achieve user logon (e.g., user impersonation).

Figure 13:
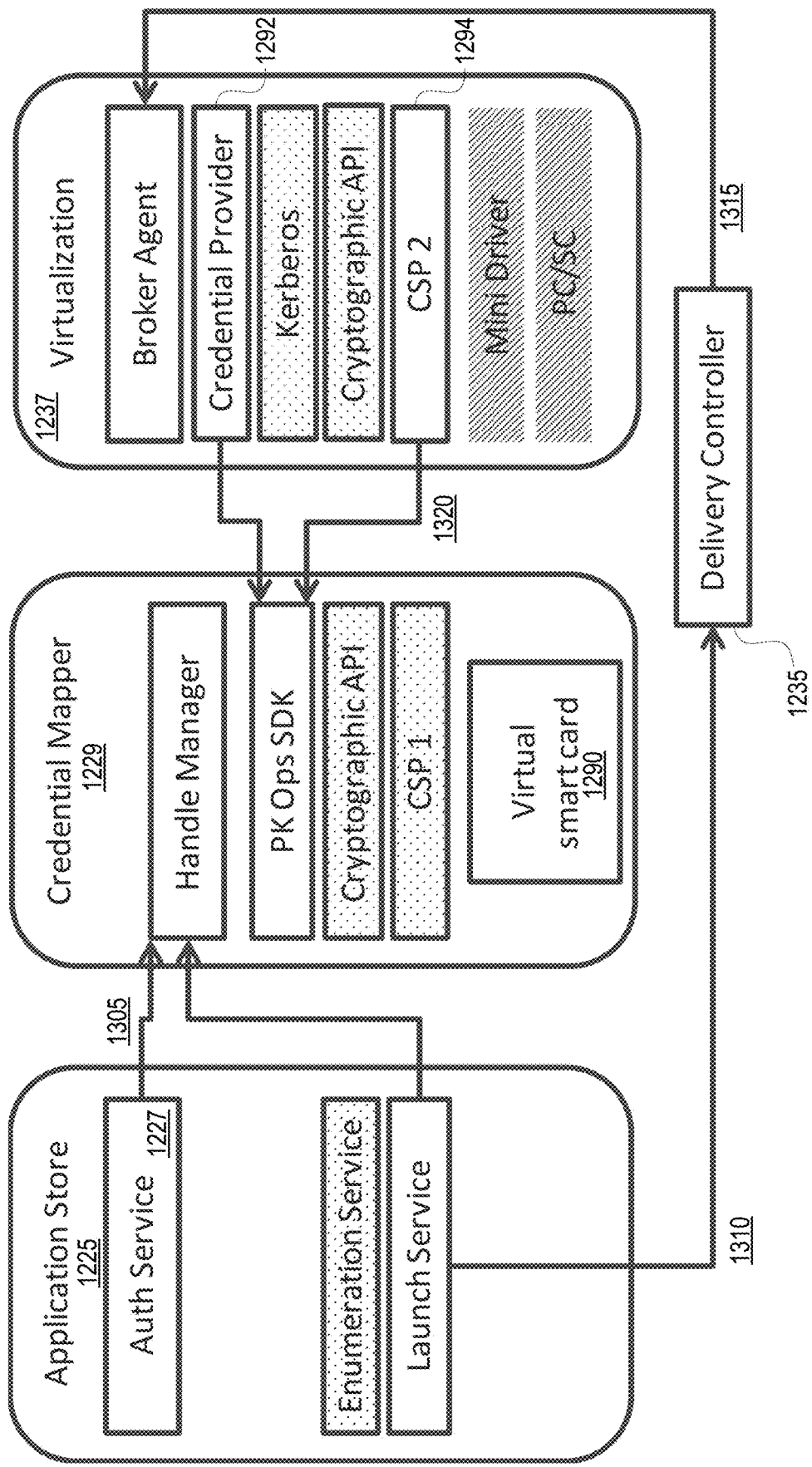
FIG. 13 depicts an illustrative interaction between an application store, a credential mapper, and a virtualization agent in accordance with one or more illustrative aspects described herein.

FIG. 13 depicts an illustrative interaction between an application store 1225, a credential mapper 1229, and a virtualization agent 1237 in accordance with one or more illustrative aspects described herein. In this example, components for fast smart card logon previously discussed may be reused to implement federated full domain logon. For example, the credential mapper 1229 may act like a network virtual smart card, except that the smart card 1290 may be ephemeral and issued based on a SAML token or other trusted identity confirmation, as previously described. Moreover, a one-shot logon ticket (or a proof key, as previously discussed) may be generated by a broker or the credential mapper 1229 to link the remote session launch request to the remote display protocol connection.

There are multiple ways in which proof keys may be used, some of which were discussed above. Another way is that the client agent may have a proof key which is linked to the SAML authentication token during authentication to the IdP. This proof key may also be linked to the virtual smart card certificate, and an interaction between the client agent and the virtualization agent involving this proof key may be performed before the virtual smart card can be used. The virtualization agent may establish whether the client agent has possession of the proof key (e.g., as a precondition for using the virtual smart card). Alternatively, the virtualization agent may mediate an indirect interaction between the client agent and the credential mapper. Mediation may be used to prove possession of the proof key before permitting virtual smart card operations, or could potentially be used to decrypt the private key of the virtual smart card.

The application store 1225 may call the authentication service 1227 (e.g., the logon data provider extension) to obtain custom logon data for one or more launch request. In step 1305, the authentication service 1227 may obtain the logon data from the credential mapper 1229. An initial interaction with credential mapper 1229 may also occur during application store 1225 logon to help minimize delays during launch. The logon data from the credential mapper 1229 may comprise a reference to a virtual smart card 1290 controlled by the credential mapper 1229. The application store 1225 may receive the logon data from the credential mapper 1229.

In step 1310, the application store 1225 may encrypt the logon data and send the encrypted data to the delivery controller 1235. Step 1310 may be performed, for example, during a client logon step. In some aspects, the encrypted logon data sent to the delivery controller 1235 may be unsigned. In step 1315, the delivery controller 1235 may send the encrypted logon data to the virtualization agent 1237. Step 1315 may be performed, for example, during session preparation, much like an encrypted username and password would be passed during a standard launch request. The application store 1225 may place the encryption key or a random value from which it can be derived in a client agent file as the logon ticket.

Virtualization agent 1237 may include a credential plugin 1239 (illustrated in, e.g., FIGS. 12A-C), and the credential plugin 1239 may be pre-registered on the virtualization agent 1237. The credential plugin 1239 may be associated with a particular credential type, and the credential type may be declared by the application store 1225 with the logon data sent to the virtualization agent 1237.

As previously explained, KCD may be used for logon. In the KCD implementation, the custom logon data from the application store 1225 may direct a different virtualization agent 1237 credential plugin to make authenticated contact back to the application store 1225 (or to the credential mapper 1229) presenting a token or ticket that the application store 1225 had issued. The application store 1225 may then use KCD to delegate the user identity to the virtualization agent 1237 just in time. This implementation may avoid building a full Kerberos delegation chain through the XML interface to the delivery controller 1235 and a brokering protocol interface to the virtualization agent 1237. The virtualization agent credential plugin may then invoke an authentication package to convert the network logon token from KCD into a full interactive logon token.

When a connection with the client is made and the logon ticket is presented, the virtualization agent 1237 may perform auto logon processing. For example, the virtualization agent 1237 may signal a credential provider 1292, which may be registered for, for example, workstation sessions. Instead of a credential provider, a credential provider filter may be used, such as in the case of remote desktop sessions. The encrypted logon data received in step 1315 may be decrypted and inspected to determine the credential type. Because the credential type may be a custom credential type, the decrypted data may be passed to the registered credential plugin. The credential plugin may generate appropriate serialized credential structures used by the WINDOWS Logon system (or any other OS logon system). The serialized credentials may be returned from the credential provider 1292 (or filter) for processing.

The credential plugin 1239 may generate a KERB_CERTIFICATE_LOGON structure, as previously described. The KERB_CERTIFICATE_LOGON structure may indicate to the operating system that a smart card domain logon is to be performed. As previously explained, the data structure may include a reference to the driver (e.g., CSP, such as CSP 1294, or KSP) that is to be used for the interactions with the smart card. In step 1320, CSP 1294 may then redirect the relevant operations to the credential mapper 1229 where the virtual smart card resides.

Authorization for the virtualization agent 1237 to use a particular virtual smart card may be two-fold. First, it may be confirmed that the virtualization agent 1237 is on a whitelist of hosts that are trusted by the credential mapper 1229. Second, it may be confirmed that the virtualization agent 1237 has received the reference from the delivery controller 1235 during session preparation. Because of the nature of the resource launch interactions between the application store 1225 and the delivery controller 1235, the application store 1225 (and therefore the credential mapper 1229) might not know the virtualization host 1237 identity that will be chosen by the delivery controller 1235 when it obtains the virtual smart card reference. Accordingly, the virtual smart card reference may be selected to be usable by any trusted virtualization host. Any trusted virtualization agent host can use the credential reference to create a virtual smart card locally.

Figure 14:
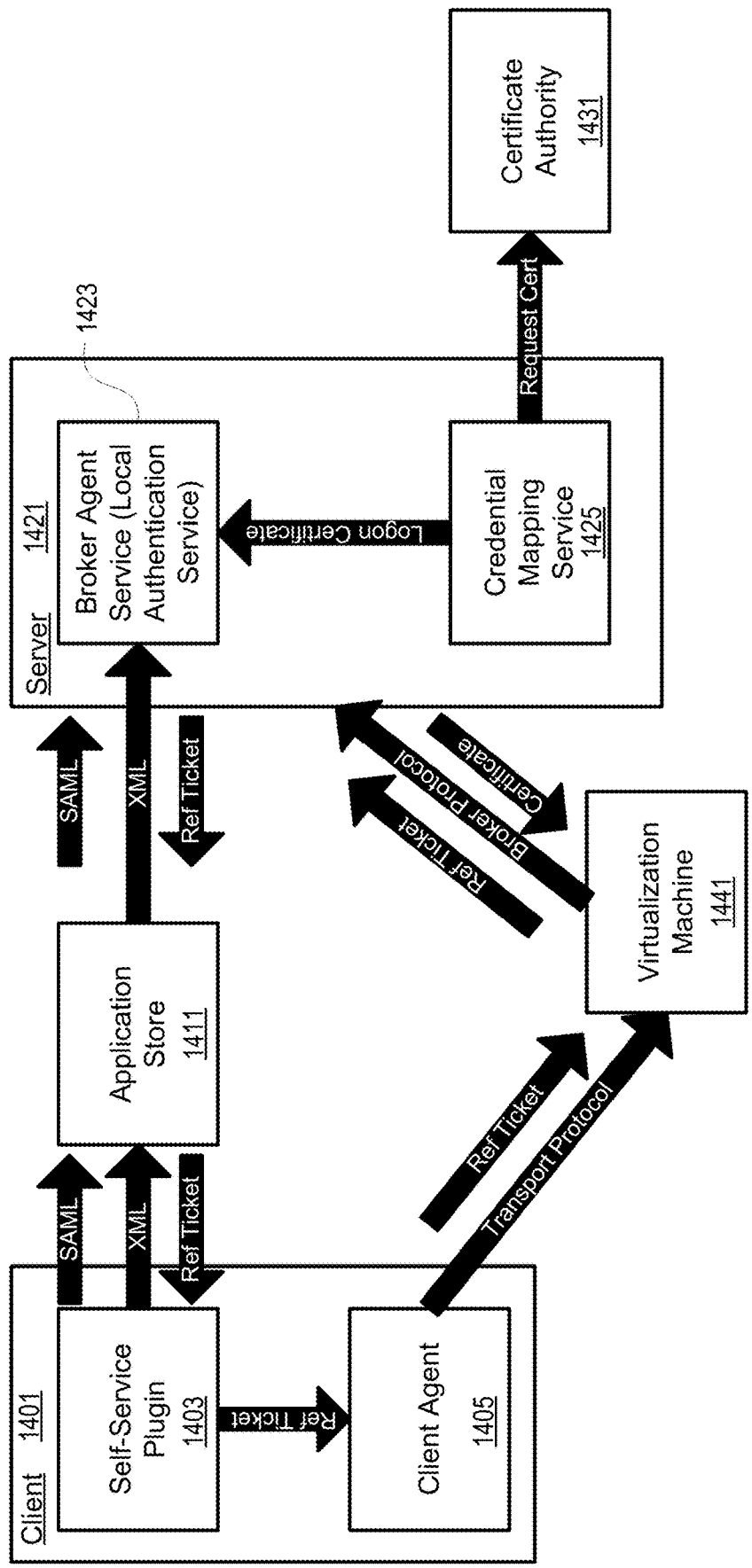
FIG. 14 depicts yet another illustrative system for federated logon in accordance with one or more illustrative aspects described herein.

FIG. 14 depicts yet another illustrative system for federated logon in accordance with one or more illustrative aspects described herein. From the perspective of a virtualization deployment, the steps performed by the components illustrated in FIG. 14 (and also FIGS. 12A-C previously discussed) may be similar in model to traditional ticket logon models, such as a reference ticket via SAML.

As previously discussed, the client device 1401 may receive a SAML authentication token from an identity provider. In order to have full domain access, the client device 1401 may send the SAML token to the application store 1411 for authentication. The application store 1411 may send the SAML token (e.g., rather than the user's clear-text password) to the broker agent service 1423 and/or a delivery controller at the server 1421, which may be used to request a reference ticket. The SAML token may be the same as the SAML token sent by the client 1401, or it may have been modified by a third party IdP. If the server 1421 determines that the SAML token is acceptable (e.g., by the delivery controller verifying the SAML token with the credential mapping service 1425), the server 1421 may create the user's ticket (which may be temporary) and also return a reference ticket that references or identifies the created ticket. For example, the credential mapping service 1425 may generate and send a PKCS10 request to a certificate authority (CA) 1431 and obtain a certificate from CA 1431 at this stage. The ticket may be stored at the server 1421, such as at the credential mapping service 1425. The server 1421 may send the reference ticket to the application store 1411, and the application store 1411 may send the reference ticket to the client 1401, via the self-service plugin 1403. On the other hand, if the SAML assertion is rejected by the credential mapping service 1425, an "Access Denied" error code may instead be returned to the application store 1411.

The client device 1401 may redeem the reference ticket for full domain logon. For example, the client agent 1405 may receive the reference ticket from the self-service plugin, optionally store the reference ticket, and send the reference ticket to the virtualization machine 1441 using a transport (e.g., remoting) protocol. The virtualization machine 1441 may send the reference ticket to the server 1421, such as a delivery controller (e.g., DDC) at the server 1421 (not illustrated). The ticket may be sent by a broker protocol, such as a CITRIX Connection Brokering Protocol (CBP). The virtualization machine 1441 might not know whether the reference ticket represents a SAML assertion login until after it sends it to the broker. The response from the broker may either be a cleartext password, or a new response structure containing a public key PKCS7 authentication certificate chain.

After receiving the reference ticket, the delivery controller may determine (based on information included in the reference ticket) that the ticket is used for a credential mapping service 1425 authentication process, rather than a clear-text password authentication process. Accordingly, rather than returning a clear-text password to the virtualization machine 1441, the delivery controller may return the logon certificate previously generated and/or stored by the credential mapping service 1425.

As previously discussed with reference to FIGS. 12A-C, the components at the server 1421 may verify that the reference ticket is correct and timely (e.g., to be redeemed within a particular time period). When the broker receives a valid reference ticket that represents a SAML assertion, it may act as a proxy between the virtualization machine 1441 and the credential mapping service 1425.

Once the certificate is provided, the client 1401 may be given access to private key signing operations over the broker protocol. The virtualization machine 1441 may log the user in using AD smart card authentication. The first communication packet may be a request for the public PKCS7 certificate chain. Subsequent requests from the virtualization machine may be for private key signature operations.

Various security policies may be used. The credential mapping service 1425 may be granted privileged access to the certificate authority 1431 (e.g., MICROSOFT Certificate Authority). The certificate authority 1431 may issue certificates for users. In addition to any restrictions placed on the credential mapping service 1425 by the certificate authority 1431, classes of security policies may be configured by the credential mapping service administrator. First, which users can log in may be controlled. An access control list (ACL) may specify who can and cannot be allowed to authenticate using the credential mapping service 1425. For example, it may be decided that no members of a Domain Administrators group will be allowed access this way. Second, which virtualization machines may redeem tickets may be restricted. At the broker's request, tickets may be redeemable by named virtualization machines (e.g., Kerberos domain account or Trust Area RID). The credential mapping service 1425 may be able to restrict the list of virtualization machines. For example, it may be determined that one virtualization machine catalogue should be allowed to authenticate using the mechanism described herein.

Third, certificate validity periods may be used. Certificates may be available for use for a short time period, such as a number of minutes. This may be controllable via the certificate authority 1431. If longer-lived certificates are desirable, a revocation system may be triggered or implemented, e.g., by user logoff. Alternatively, longer-lived network virtual smart cards may be utilized. The network virtual smart cards may be protected to a higher security level, for example by using a Hardware Security Module or Trusted Platform Module (TPM) to encrypt the virtual smart card private keys. Alternatively, each private key may be linked to a persistent proof key held by a specific client agent. The virtual smart cards might not be revoked on logoff, but could be stored persistently by the credential mapping service 1425. Accordingly, the virtual smart cards stored at the credential mapping service 1425 may be reused over longer periods of time (e.g., for the duration of a session, and not just for domain logon) because they are stored at the credential mapping service 1425 (rather than a specific virtualization host), which may provide stronger protection of the virtual smart cards and other performance benefits.

Fourth, certificate caching and revalidation may be controlled. Certificates may be used both for initial authentication and subsequent desktop unlock operations. By default, certificates may be cached for a time period, but an administrator may wish to configure a policy whereby a new certificate is generated by submitting a new SAML token. Fifth, SAML assertion verification may be implemented. Standard controls over verifying SAML tokens may be provided. SAML tokens that assert a Windows UPN may be allowed initially, which might require special configuration of third party IdPs.

Various other security controls may be configured for components described herein. For example, the administrator, such as a directory service (e.g., AD) administrator, for each user domain may manually configure trust of the relevant CA. For example, the administrator may import certificates, such as root or subordinate root certificates, into a protected data store, such as a MICROSOFT NTAuth Certificates store in AD. Importing these certificates may indicate that the relevant CA is trusted to issue certificates of a smart card or domain controller type. Importation of certificates may be performed automatically when WINDOWS certificate services is deployed as an Enterprise CA.

The CA administrator may also import or create, for example, three certificate templates. The first template may be used to bootstrap initial trust in a data center server, which may provide virtualization components and services. The second template may be used to allow automated certificate renewal of data center server credentials and issuance of credentials for new data center servers that join the cluster. The third template may be used to issue smart card logon certificates for users. The CA may have access controls that determine which data center servers can use the templates.

Another security control may comprise manual approval by the CA administrator to bootstrap trust for the credential request from the data center server. Yet another security control may comprise the data center server itself implementing a set of security controls to identify the application store servers that are authorized to request the creation of virtual smartcards, and the virtualization machines that are authorized to use virtual smartcards for logon. It may also have controls to identify or limit the set of users who can be impersonated in this way.

Illustrative Embodiments of a Credential Mapping Service

Embodiments of the credential mapping service previously discussed may be implemented in various ways. One goal is a system where users can be easily and quickly logged on to an Active Directory user account using certificates.

In one aspect, the remote service described herein may be located in the client agent on the client device. In these aspects, the client agent may directly use the user's smart card to perform the authentication step. This may use a new virtual channel, as previously discussed.

In another aspect, the remote service may comprise a credential mapping service, as previously discussed. This service may be used for issuing and storing smart card certificates on-the-fly using a certificate authority, such as the Enterprise MICROSOFT Certificate Authority. Alternatively, the certificates may be pre-created. The credential mapping service in combination with the Certificate Authority may be used for enforcing various aspects of authentication policy.

Figure 15:
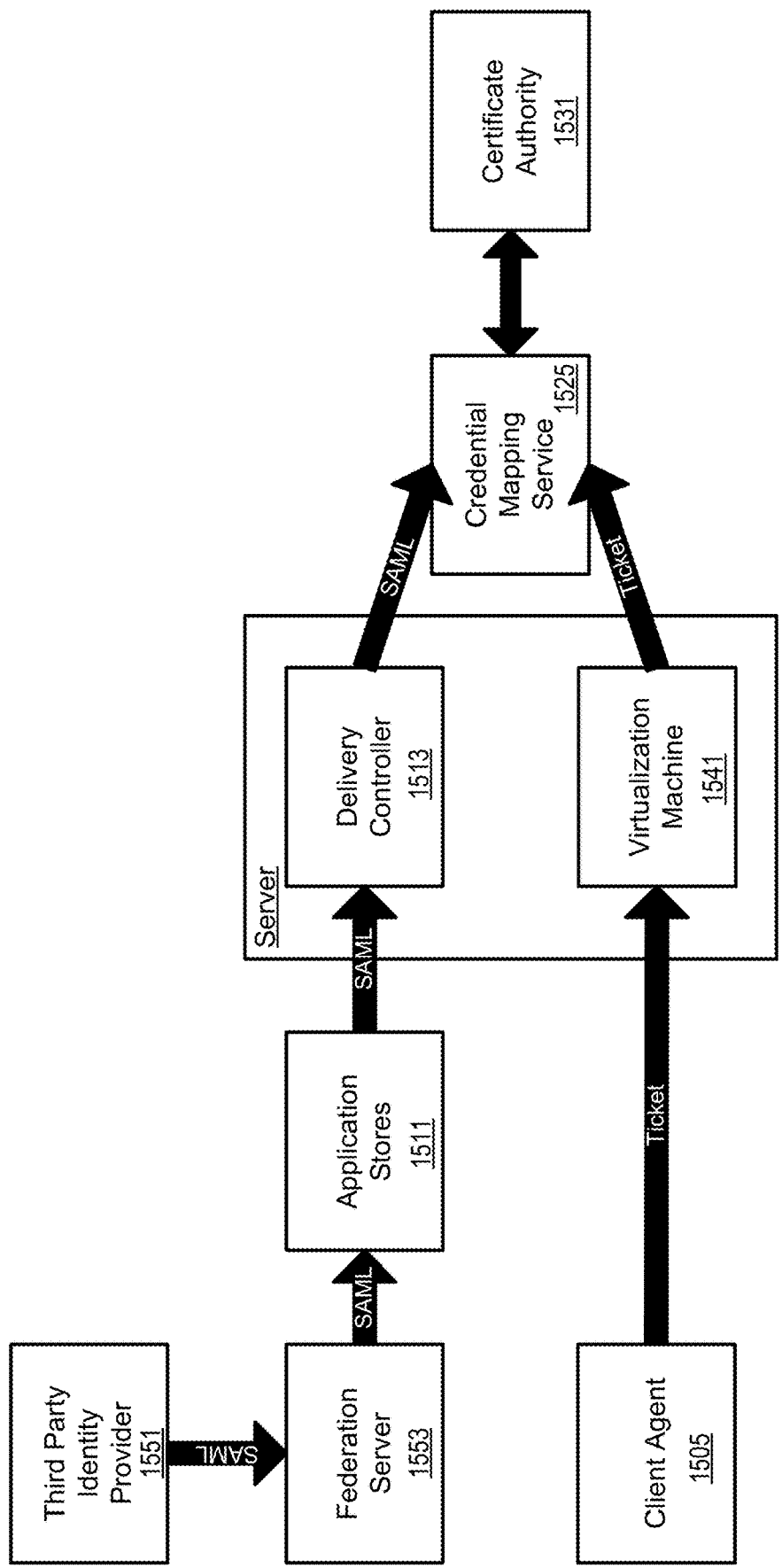
FIG. 15 depicts an illustrative system for providing a credential mapping service in accordance with one or more illustrative aspects described herein.

FIG. 15 depicts an illustrative system for providing a credential mapping service in accordance with one or more illustrative aspects described herein. A third party IdP 1551 may send an identity confirmation token (e.g., a SAML token) to a federation server 1553. The federation server 1553 may send the token to the application store 1511, which may forward the token to a delivery controller 1513. The credential mapping service 1525 may accept SAML tokens from specifically enrolled delivery controllers 1513 over a protected connection. If the authentication is allowed by the configured policy, it may return a one-time usage secure random ticket which may be passed to the client agent 1505. The client agent 1505 may present the ticket to a virtualization machine 1541, and when the virtualization machine encounters the ticket, it may present it to the credential mapping service 1525 (e.g., over a trusted connection). This may allow the logon system access to a remote cryptographic operation protocol server running in the credential mapping service 1525. The credential mapping service 1525 may generate a private key and enroll a temporary smartcard certificate for the user identified by the SAML token to perform the cryptographic aspects of authentication. In some aspects, the generated private key may be wrapped using a key derived from or related to the secure random ticket.

When explicit authentication into an Active Directory account is desired, a separate high-privileged service may be installed. This service may be configured by a domain administrator. Domain administrator (or equivalent) credentials may be used to configure the domain's certificate authority 1531 for use by credential mapping service 1525. This might be done once, and may be done automatically from an Administrator's console.

When configuring the credential mapping service 1525, a certificate authority 1531 may be selected from a list of all CAs available in the domain. Domain administrator (or equivalent) credentials may be used to authorize the credential mapping service 1525 to access the selected CA 1531. The domain administrator (or equivalent) may acknowledge the authorization of the credential mapping service 1525 using the selected CA's administration console. For security reasons, the operations described herein may be done for each credential mapping service.

The credential mapping service 1525 may have three basic lists for runtime configuration: a list of machines able to request that credentials be mapped, a list of user accounts that can be mapped (e.g. a group), and a list of machines able to perform AD logons based on mapped credentials. Accordingly, the security decision may have the following form: application store A may map a SAML assertion B onto an active directory account C. The logon may then take place on virtualization server D.

Various benefits are available based on the concepts disclosed herein. First, a few operations, such as "get certificate from smartcard" and "perform private key" operations, may utilize round-trip communications between the server and the smart card (e.g., on the client device). Accordingly, the logon process may be noticeably faster.

Furthermore, smartcard logon may be successful even if no compatible smartcard drivers are installed on the server.

Another benefit is that one time passwords may provide access to a real active directory account. Anonymous logons may also be temporarily mapped to full AD accounts. Third-party authentication solutions can be easily mapped into the virtualization machine.

For the fast smart card logon feature, there may be integration with the WINDOWS PKINIT Logon System. A credential provider package may be installed on to server machines that are to interoperate with this authentication system. This may comprise an extension to credential providers already included in some systems. The new functionality of this package may be to instruct WINDOWS to log in with PKINIT using a CSP. The CSP may ultimately communicate with a remote process which provides the actual logon certificate and performs associated private key operations. A virtual channel may act as a conduit between the CSP and the existing authentication manager program running on the client. Three transactions (or operations) include "get smartcard user certificate," "perform private key signature," and "decrypt with private key". The authentication manager may use the local smartcard directly to satisfy PKOps requests, which may log the user into the virtualization machine. As the authentication manager may already have unlocked the smart card to log into the application store, this may also provide SSO functionality.

In some additional aspects, rather than passing the PKOps requests to the client via the virtual channel, the requests may be directed to a credential mapping service (CMS). The CMS Server may authorize logon and perform PKOps. A trusted service installed on a separate server may service PKOps requests from the CSP to log in the appropriate user after it has performed authorization checks. As it has a separate secure communication path with the delivery controller, the CMS may authorize logon requests that it is expecting. A "single use ticket" presented by the CSP may be one mechanism to achieve this. The CMS may automatically enroll smartcard certificates. To perform user logons, the CMS internally may automatically generate smart card certificate requests and have them issued by the MICROSOFT certificate authority or a third-party CA. The PKOps requests from the CSP may be serviced based on these certificates. The CMS may additionally protect the private keys for the certificates using encryption with a key wrapping key derived from the single use ticket, or using a Hardware Security Module or a Trusted Platform Module, or other similar means.

General security requirements may exist. Private keys may be protected and used to sign PKINIT requests. Whenever servicing a PKOps private key signing request, the server may ensure that it is actually performing a Kerberos logon by inspecting that the data it is signing is an ASN-1 structure corresponding to the appropriate Kerberos protocol data. An attempt to perform private key operations on other data structures may be rejected. For the decrypt operation, the decrypted data may be inspected before being returned to the server to ensure it has an expected ASN-1 structure corresponding to the Kerberos protocol operation. Private keys might not be generated or stored on virtualization machines. The PKOps protocol may ensure that private keys do not need to be present on the machine that users are logging in to. Private keys may reside in the smart card on the client machine, or in the CMS server which can be isolated.

In some embodiments, a user may reconnect to a remote session (e.g., a remote application or desktop session). The reconnection may use a different authentication method and/or a different security context as the original launch. Upon reconnection, the claims could be updated to reflect the new authentication method, assurance level, and/or other security context information, such as location and device. This update may be performed in addition to reflecting the information into Kerberos tickets (where security groups membership is tracked), and into the session certificate itself, which could be used for TLS client authentication and then inspected by other servers), as described above. In some aspects, a new certificate may be generated for each launch or reconnect, rather than using the certificate pre-creation or caching model described above.

As with a launch, a normal (e.g., WINDOWS or other OS) authentication process may occur for the reconnect, as previously described. At the OS level, this authentication (e.g., re-authentication of the currently logged on session user) may be used to confirm that the session may be unlocked because the correct user is present. After confirmed that the user is the correct user, the existing session may be made accessible so that the user can see and use the user's applications. However, the virtualization agent (which may be orchestrating this activity during the reconnect operation) may arrange that the Kerberos ticket information for the session (based on the original authentication to launch the session) be discarded and replaced with the new Kerberos tickets that were obtained during the re-authentication. Existing APIs in the OS may be used to discard and replace Kerberos tickets in this way. For example, the WINDOWS command klist.exe may be used. The updated information may also be propagated to certain parts of the OS that work in special ways, such as services which manages file share access.

Alternatively, the original session certificate may be replaced with the new certificate. The session certificate may comprise the logon certificate previously discussed, but with a lifetime that is long enough for use during the session and propagated into the OS certificate store so that it is accessible to the applications. To clean up any application level TLS connection state that was based on a previous certificate, the browser may be, for example, restarted to correctly pick up the new certificate. Alternatively, an attribute authority model may be used. For example, the session certificate might not contain the actual security context information, but rather a pointer (e.g., with suitable session reference) to a service that knows the information, such as the credential mapper service, as previously described. A website that uses TLS client authentication may query this attribute service to learn the true information.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    establishing a virtual channel between a server and a client device, wherein the virtual channel is at a higher communication level than a personal computer/smart card (PC/SC) communication level;
    receiving, by the server from the client device, a message comprising answer to reset (ATR) data of a smart card associated with the client device;
    substituting, by the server, the ATR data of the smart card with proxy ATR data of a proxy smart card;

determining, by the server, based on the proxy ATR data, a cryptographic service provider for the proxy smart card; and transmitting, by the server, via the cryptographic service provider, via the virtual channel, and to the client device, one or more requests for a cryptographic operation involving the smart card.

2. The method of claim 1, wherein the receiving the message comprises receiving the message via a personal computer/smart card (PC/SC) protocol.

3. The method of claim 1, wherein the substituting the ATR data with the proxy ATR data is performed by a personal computer/smart card (PC/SC) redirection layer of the server.

4. The method of claim 1, wherein the substituting the ATR data with the proxy ATR data comprises retrieving, via a personal computer/smart card (PC/SC) hook of the server, the proxy ATR data.

5. The method of claim 1, wherein the determining the cryptographic service provider comprises querying a database for an association between the proxy ATR data and the cryptographic service provider.

6. The method of claim 1, further comprising:
generating a substitute identifier associated with the proxy ATR data; and
storing, in a database, the substitute identifier in association with the cryptographic service provider to use for one or more cryptographic operations with the smart card.

7. The method of claim 6, wherein the storing the substitute identifier comprises storing the substitute identifier in a same file as information identifying the cryptographic service provider.

8. The method of claim 1, wherein the ATR data comprises an identifier that identifies a smart card type of the smart card.

9. An apparatus comprising:
one or more processors; and
memory storing instructions that, when executed by the one or more processors, cause the apparatus to:
establish a virtual channel between the apparatus and a client device, wherein the virtual channel is at a higher communication level than a personal computer/smart card (PC/SC) communication level;
receive, from the client device, a message comprising answer to reset (ATR) data of a smart card associated with the client device;
substitute the ATR data of the smart card with proxy ATR data of a proxy smart card;
determine, based on the proxy ATR data, a cryptographic service provider for the proxy smart card; and
transmit, via the cryptographic service provider, via the virtual channel, and to the client device, one or more requests for a cryptographic operation involving the smart card.

10. The apparatus of claim 9, wherein the instructions, when executed by the one or more processors, cause the apparatus to receive the message via a personal computer/smart card (PC/SC) protocol.

11. The apparatus of claim 9, wherein the instructions, when executed by the one or more processors, cause the apparatus to substitute the ATR data with the proxy ATR data via a personal computer/smart card (PC/SC) redirection layer of the apparatus.

12. The apparatus of claim 9, wherein the instructions, when executed by the one or more processors, cause the apparatus to substitute the ATR data with the proxy ATR data by retrieving, via a personal computer/smart card (PC/SC) hook of the apparatus, the proxy ATR data.

13. The apparatus of claim 9, wherein the instructions, when executed by the one or more processors, cause the apparatus to determine the cryptographic service provider by querying a database for an association between the proxy ATR data and the cryptographic service provider.

14. The apparatus of claim 9, wherein the instructions, when executed by the one or more processors, further cause the apparatus to:
generate a substitute identifier associated with the proxy ATR data; and
store, in a database, the substitute identifier in association with the cryptographic service provider to use for one or more cryptographic operations with the smart card.

15. The apparatus of claim 14, wherein the instructions, when executed by the one or more processors, cause the apparatus to store the substitute identifier in a same file as information identifying the cryptographic service provider.

16. The apparatus of claim 9, wherein the ATR data comprises an identifier that identifies a smart card type of the smart card.

17. A non-transitory computer-readable medium storing instructions that, when executed by a computing device, cause the computing device to:
establish a virtual channel between a server and a client device, wherein the virtual channel is at a higher communication level than a personal computer/smart card (PC/SC) communication level;
receive, from the client device, a message comprising answer to reset (ATR) data of a smart card associated with the client device;
substitute the ATR data of the smart card with proxy ATR data of a proxy smart card;
determine, based on the proxy ATR data, a cryptographic service provider for the proxy smart card; and
transmit, via the cryptographic service provider, via the virtual channel, and to the client device, one or more requests for a cryptographic operation involving the smart card.

18. The non-transitory computer-readable medium of claim 17, wherein the instructions, when executed by the computing device, cause the computing device to determine the cryptographic service provider by querying a database for an association between the proxy ATR data and the cryptographic service provider.

19. The non-transitory computer-readable medium of claim 17, wherein the instructions, when executed by the computing device, further cause the computing device to:
generate a substitute identifier associated with the proxy ATR data; and
store, in a database, the substitute identifier in association with the cryptographic service provider to use for one or more cryptographic operations with the smart card.

20. The non-transitory computer-readable medium of claim 17, wherein the ATR data comprises an identifier that identifies a smart card type of the smart card.

* * * * *